US012446965B2

(12) United States Patent
Lavi et al.

(10) Patent No.: US 12,446,965 B2
(45) Date of Patent: Oct. 21, 2025

(54) ENHANCED USER INTERFACE AND CROSSTALK ANALYSIS FOR VASCULAR INDEX MEASUREMENT

(71) Applicant: Cathworks Ltd., Kfar Saba (IL)

(72) Inventors: Ifat Lavi, Moshav Mishmeret (IL); Moran Shalhon Livne, Rosh Haayin (IL)

(73) Assignee: Cathworks Ltd., Kfar Saba (IL)

( * ) Notice: Subject to any disclaimer, the term of this patent is extended or adjusted under 35 U.S.C. 154(b) by 0 days.

(21) Appl. No.: 18/821,934

(22) Filed: Aug. 30, 2024

(65) Prior Publication Data

US 2025/0049507 A1     Feb. 13, 2025

Related U.S. Application Data

(63) Continuation of application No. PCT/IB2024/057718, filed on Aug. 9, 2024.
(Continued)

(51) Int. Cl.
*A61B 34/10*     (2016.01)
*A61B 34/00*     (2016.01)
(Continued)

(52) U.S. Cl.
CPC .............. *A61B 34/10* (2016.02); *A61B 34/25* (2016.02); *G16H 50/30* (2018.01); *G16H 50/50* (2018.01); *A61B 2034/105* (2016.02)

(58) Field of Classification Search
CPC . G06T 2207/20081; G06T 2207/30101; G06T 7/0012; G06T 2207/10081;
(Continued)

(56) References Cited

U.S. PATENT DOCUMENTS 5,150,292 A    9/1992   Hoffmann et al.
5,638,823 A    6/1997   Akay et al.
(Continued)

FOREIGN PATENT DOCUMENTS

AU    2010298333    1/2012
CN    104282009    1/2015
(Continued)

OTHER PUBLICATIONS

Abraham et al., "Alternative routes in road networks", ACM Journal of Experimental Algorithmics, Association of Computing Machinery, vol. 18(1):1.3:2-1.3:17 (2013).
(Continued)

*Primary Examiner* — Manuchehr Rahmjoo
(74) *Attorney, Agent, or Firm* — Knobbe, Martens, Olson & Bear, LLP

(57) ABSTRACT

Systems and methods for enhanced user interface and crosstalk analysis for cardiac index determination. An example method includes accessing a cardiac model of a portion of a patient's heart, the portion including one or more vessels of the patient's heart, and the cardiac model indicating a plurality of lesions along a length of at least one of the vessels; obtaining, based on the cardiac model for the lesions, respective positions along the length for which the lesions are associated with index drops, wherein the index drops are with respect to an index indicative of vascular function; and causing presentation of a user interface, wherein the user interface: presents a graph mapping the length to the index indicative of vascular function, presents individual toggles enabling nulling of individual lesions, and updates the graph in response to received user input to one or more of the toggles, wherein the user input nulls effects of one or more lesions.

19 Claims, 7 Drawing Sheets

Related U.S. Application Data

(60) Provisional application No. 63/518,529, filed on Aug. 9, 2023.

(51) Int. Cl.
*G16H 50/30* (2018.01)
*G16H 50/50* (2018.01)

(58) Field of Classification Search
CPC . G06T 2207/20084; G06T 2207/10088; G06T 2207/10101; G06T 2207/10132; G06T 2207/30048; A61B 5/02007; A61B 6/032; A61B 6/504; A61B 17/1355; A61B 2017/00199; A61B 2017/00221; A61B 5/0066; A61B 5/0075; A61B 5/022; A61B 5/055; A61B 5/412; A61B 5/413; A61B 5/7267; A61B 5/742; A61B 5/7475; A61B 6/037; A61B 6/481; A61B 6/5205; A61B 6/5217; A61B 8/12; A61B 8/14; G16H 30/20; G16H 50/20; G16H 10/60; G16H 30/40; G16H 50/30; G06N 3/08; G06N 5/04; G06V 10/20; G06V 10/245; G06V 10/247; G06V 10/761; G06V 10/764; G06V 40/14; G06V 2201/00
See application file for complete search history.

(56) References Cited

U.S. PATENT DOCUMENTS

| | | | |
|---|---|---|---|
| 6,047,080 A | 4/2000 | Chen et al. | |
| 6,186,948 B1 | 2/2001 | Kamiyama et al. | |
| 6,236,878 B1 | 5/2001 | Taylor et al. | |
| 6,501,848 B1 | 12/2002 | Carroll et al. | |
| 6,842,638 B1 | 1/2005 | Suri et al. | |
| 7,113,623 B2 | 9/2006 | Chen et al. | |
| 7,339,585 B2 | 3/2008 | Verstraelen et al. | |
| 7,369,691 B2 | 5/2008 | Kondo et al. | |
| 7,574,026 B2 | 8/2009 | Rasche et al. | |
| 7,657,299 B2 | 2/2010 | Huizenga et al. | |
| 7,693,315 B2 | 4/2010 | Krishnan et al. | |
| 7,738,626 B2 | 6/2010 | Weese et al. | |
| 7,808,503 B2 | 10/2010 | Duluk, Jr. et al. | |
| 7,860,283 B2 | 12/2010 | Begelman et al. | |
| 7,864,997 B2 | 1/2011 | Aben | |
| 7,912,260 B2 | 3/2011 | Breeuwer et al. | |
| 7,970,187 B2 | 6/2011 | Puts et al. | |
| 7,983,459 B2 | 7/2011 | Begelman et al. | |
| 8,073,224 B2 | 12/2011 | Strobel et al. | |
| 8,086,000 B2 | 12/2011 | Weijers et al. | |
| 8,090,164 B2 | 1/2012 | Bullitt et al. | |
| 8,155,411 B2 | 4/2012 | Hof et al. | |
| 8,298,147 B2 | 10/2012 | Huennekens et al. | |
| 8,311,748 B2 | 11/2012 | Taylor et al. | |
| 8,311,750 B2 | 11/2012 | Taylor | |
| 8,315,812 B2 | 11/2012 | Taylor | |
| 8,321,150 B2 | 11/2012 | Taylor | |
| 8,331,314 B2 | 12/2012 | Quiang et al. | |
| 8,496,594 B2 | 7/2013 | Taylor et al. | |
| 8,523,779 B2 | 9/2013 | Taylor et al. | |
| 8,548,778 B1 | 10/2013 | Hart et al. | |
| 8,554,490 B2 | 10/2013 | Tang et al. | |
| 8,560,968 B1 | 10/2013 | Nair | |
| 8,594,950 B2 | 11/2013 | Taylor | |
| 8,715,184 B2 | 5/2014 | Lazebnik | |
| 8,768,669 B1 | 7/2014 | Hart et al. | |
| 8,771,195 B2 | 7/2014 | Kim et al. | |
| 8,787,641 B2 | 7/2014 | Hof et al. | |
| 8,812,246 B2 | 8/2014 | Taylor | |
| 8,824,752 B1 | 9/2014 | Fonte et al. | |
| 8,837,860 B1 | 9/2014 | Grady et al. | |
| 8,861,820 B2 | 10/2014 | Fonte et al. | |
| 8,917,925 B1 | 12/2014 | Grady et al. | |
| 8,934,686 B2 | 1/2015 | Ostrovsky-Berman et al. | |
| 8,970,578 B2 | 3/2015 | Voros et al. | |
| 9,008,405 B2 | 4/2015 | Fonte et al. | |
| 9,042,611 B2 | 5/2015 | Blezek et al. | |
| 9,042,613 B2 * | 5/2015 | Spilker | A61B 34/10 600/419 |
| 9,070,214 B1 | 6/2015 | Grady et al. | |
| 9,078,564 B2 | 7/2015 | Taylor | |
| 9,087,147 B1 | 7/2015 | Fonte | |
| 9,129,418 B2 | 9/2015 | Schormans et al. | |
| 9,138,147 B2 | 9/2015 | Schmitt et al. | |
| 9,153,047 B1 | 10/2015 | Grady et al. | |
| 9,189,600 B2 | 11/2015 | Spilker et al. | |
| 9,256,936 B2 | 2/2016 | Jacobs et al. | |
| 9,314,584 B1 | 4/2016 | Riley et al. | |
| 9,375,191 B2 | 6/2016 | Verstraelen et al. | |
| 9,406,141 B2 | 8/2016 | Kelm et al. | |
| 9,430,827 B2 | 8/2016 | Kelm et al. | |
| 9,466,117 B2 | 10/2016 | Habets et al. | |
| 9,471,999 B2 | 10/2016 | Ishii et al. | |
| 9,572,495 B2 | 2/2017 | Schmitt et al. | |
| 9,576,360 B2 | 2/2017 | Schormans et al. | |
| 9,613,186 B2 | 4/2017 | Fonte | |
| 9,615,755 B2 | 4/2017 | Riley et al. | |
| 9,633,454 B2 | 4/2017 | Lauritsch et al. | |
| 9,646,361 B2 | 5/2017 | Koo et al. | |
| 9,706,925 B2 | 7/2017 | Taylor | |
| 9,743,835 B2 | 8/2017 | Taylor | |
| 9,754,082 B2 | 9/2017 | Taylor et al. | |
| 9,786,068 B2 | 10/2017 | Ishii et al. | |
| 9,801,689 B2 | 10/2017 | Taylor | |
| 9,805,465 B2 | 10/2017 | Kyriakou | |
| 9,814,433 B2 | 11/2017 | Benishti et al. | |
| 9,858,387 B2 | 1/2018 | Lavi et al. | |
| 9,870,634 B2 | 1/2018 | Grady et al. | |
| 9,888,896 B2 | 2/2018 | Lauritsch et al. | |
| 9,934,566 B2 | 4/2018 | Sun et al. | |
| 9,940,736 B2 | 4/2018 | Ishii et al. | |
| 9,943,233 B2 | 4/2018 | Lavi et al. | |
| 9,965,873 B2 | 5/2018 | Grady et al. | |
| 9,968,256 B2 | 5/2018 | Taokowsky et al. | |
| 9,977,869 B2 | 5/2018 | Lavi et al. | |
| 9,999,361 B2 | 6/2018 | Sharma et al. | |
| 10,141,074 B2 | 11/2018 | Lavi et al. | |
| 10,143,390 B2 | 12/2018 | Ledoux et al. | |
| 10,159,529 B2 | 12/2018 | Taylor | |
| 10,176,575 B2 | 1/2019 | Isgum et al. | |
| 10,210,956 B2 | 2/2019 | Lavi et al. | |
| 10,219,704 B2 | 3/2019 | Lavi et al. | |
| 10,229,516 B2 | 3/2019 | Aben et al. | |
| 10,235,796 B2 | 3/2019 | Aben et al. | |
| 10,245,001 B2 | 4/2019 | Redel et al. | |
| 10,342,442 B2 | 7/2019 | Hattangadi et al. | |
| 10,354,744 B2 | 7/2019 | Sharma et al. | |
| 10,360,674 B2 | 7/2019 | Contini et al. | |
| 10,363,018 B2 | 7/2019 | Fukuda et al. | |
| 10,373,700 B2 | 8/2019 | Sharma et al. | |
| 10,376,165 B2 | 8/2019 | Lavi et al. | |
| 10,395,366 B2 | 8/2019 | Isgum et al. | |
| 10,395,774 B2 | 8/2019 | Lavi et al. | |
| 10,420,610 B2 | 9/2019 | Bai et al. | |
| 10,424,063 B2 | 9/2019 | Lavi et al. | |
| 10,441,235 B2 | 10/2019 | Lavi et al. | |
| 10,441,239 B2 | 10/2019 | Abe | |
| 10,456,094 B2 | 10/2019 | Fonte et al. | |
| 10,463,336 B2 | 11/2019 | Itu et al. | |
| 10,470,730 B2 | 11/2019 | Benishti et al. | |
| 10,559,388 B2 | 2/2020 | Lavi et al. | |
| 10,580,141 B2 | 3/2020 | Freiman et al. | |
| 10,580,526 B2 | 3/2020 | Ma et al. | |
| 10,595,807 B2 | 3/2020 | Lavi et al. | |
| 10,631,737 B2 | 4/2020 | Lavi et al. | |
| 10,636,146 B2 | 4/2020 | Zhong et al. | |
| 10,650,522 B2 | 5/2020 | Hoi et al. | |
| 10,682,180 B2 | 6/2020 | Taylor | |
| 10,699,407 B2 | 6/2020 | Isgum et al. | |
| 10,702,339 B2 | 7/2020 | Taylor | |
| 10,733,792 B2 | 8/2020 | Aben et al. | |
| 10,740,961 B2 | 8/2020 | Reiber et al. | |
| 10,748,285 B2 | 8/2020 | Igarashi et al. | |

(56) References Cited

U.S. PATENT DOCUMENTS

| | | |
|---|---|---|
| 10,758,200 B2 | 9/2020 | Passerini et al. |
| 10,776,988 B2 | 9/2020 | Grady et al. |
| 10,803,994 B2 | 10/2020 | Lavi et al. |
| 10,803,995 B2 | 10/2020 | Sharma et al. |
| 10,828,109 B2 | 11/2020 | Redel |
| 10,854,329 B2 | 12/2020 | Mohr et al. |
| 10,964,017 B2 | 3/2021 | Pack et al. |
| 10,964,071 B2 | 3/2021 | Grady et al. |
| 11,004,198 B2 | 5/2021 | Isgum et al. |
| 11,017,531 B2 | 5/2021 | Harish et al. |
| 11,031,136 B2 | 6/2021 | Grass et al. |
| 11,051,779 B2 | 7/2021 | Turca et al. |
| 11,055,845 B2 | 7/2021 | Nickisch et al. |
| 11,076,770 B2 | 8/2021 | Lavi et al. |
| 11,081,237 B2 | 8/2021 | Lavi et al. |
| 11,083,377 B2 | 8/2021 | Bouwman et al. |
| 11,083,524 B2 | 8/2021 | Taylor |
| 11,087,884 B2 | 8/2021 | Sankaran et al. |
| 11,090,118 B2 | 8/2021 | Taylor |
| 11,116,575 B2 | 9/2021 | Taylor |
| 11,127,503 B2 | 9/2021 | Rabbat et al. |
| 11,138,733 B2 | 10/2021 | Lavi et al. |
| 11,141,123 B2 | 10/2021 | Homann et al. |
| 11,160,524 B2 | 11/2021 | Lavi et al. |
| 11,179,043 B2 | 11/2021 | Haase et al. |
| 11,185,368 B2 | 11/2021 | Spilker et al. |
| 11,195,278 B2 | 12/2021 | Nickisch et al. |
| 11,202,612 B2 | 12/2021 | Sakaguchi |
| 11,216,944 B2 | 1/2022 | Reiber et al. |
| 11,272,845 B2 | 3/2022 | Cheline et al. |
| 11,278,208 B2 | 3/2022 | Lavi et al. |
| 11,282,170 B2 | 3/2022 | Gauriau et al. |
| 11,288,811 B2 | 3/2022 | Tu et al. |
| 11,288,813 B2 | 3/2022 | Grady et al. |
| 11,295,864 B2 | 4/2022 | Benishti et al. |
| 11,298,187 B2 | 4/2022 | Taylor |
| 11,304,665 B2 | 4/2022 | Sharma et al. |
| 11,308,621 B2 | 4/2022 | Tu et al. |
| 11,328,824 B2 | 5/2022 | Fonte |
| 11,341,631 B2 | 5/2022 | Song et al. |
| 11,375,904 B2 | 7/2022 | Igarashi |
| 11,382,569 B2 | 7/2022 | Grady et al. |
| 11,389,130 B2 | 7/2022 | Itu et al. |
| 11,398,029 B2 | 7/2022 | Grady et al. |
| 11,406,337 B2 | 8/2022 | Lavi et al. |
| 11,406,339 B2 | 8/2022 | Mistretta et al. |
| 11,409,422 B2 | 8/2022 | Olivan Bescos et al. |
| 11,410,308 B2 | 8/2022 | Gulsun et al. |
| 11,423,532 B2 | 8/2022 | Takahashi et al. |
| 11,424,036 B2 | 8/2022 | Fonte et al. |
| 11,424,038 B2 | 8/2022 | Grady et al. |
| 11,443,428 B2 | 9/2022 | Petersen et al. |
| 11,445,923 B2 | 9/2022 | Tu et al. |
| 11,462,326 B2 | 10/2022 | Wang et al. |
| 11,462,329 B2 | 10/2022 | Rabbat et al. |
| 11,468,567 B2 | 10/2022 | Groth et al. |
| 11,482,339 B2 | 10/2022 | Koo et al. |
| 11,490,867 B2 | 11/2022 | Homann et al. |
| 11,494,904 B2 | 11/2022 | Fonte et al. |
| 11,495,357 B2 | 11/2022 | Ma et al. |
| 11,501,485 B2 | 11/2022 | Grady et al. |
| 11,508,460 B2 | 11/2022 | Wang et al. |
| 11,510,587 B2 | 11/2022 | Kristanto et al. |
| 11,521,755 B2 | 12/2022 | Taylor et al. |
| 11,523,744 B2 | 12/2022 | Freiman et al. |
| 11,538,161 B2 | 12/2022 | Wang et al. |
| 11,540,931 B2 | 1/2023 | Grady et al. |
| 11,557,036 B2 | 1/2023 | Liao et al. |
| 11,557,069 B2 | 1/2023 | Senzig et al. |
| 11,559,274 B2 | 1/2023 | Auvray et al. |
| 11,564,746 B2 | 1/2023 | Spilker et al. |
| 11,564,748 B2 | 1/2023 | Thienphrapa et al. |
| 11,574,406 B2 | 2/2023 | Chen et al. |
| 11,576,621 B2 | 2/2023 | Sharma et al. |
| 11,576,626 B2 | 2/2023 | Fonte et al. |
| 11,576,637 B2 | 2/2023 | Schmitt et al. |
| 11,576,639 B2 | 2/2023 | Song et al. |
| 11,583,340 B2 | 2/2023 | Taylor |
| 11,589,924 B2 | 2/2023 | Passerini et al. |
| 11,599,996 B2 | 3/2023 | Isgum et al. |
| 11,607,189 B2 | 3/2023 | Tu et al. |
| 11,610,309 B2 | 3/2023 | Kweon et al. |
| 11,610,318 B2 | 3/2023 | Grady et al. |
| 11,615,529 B2 | 3/2023 | Chitiboi |
| 11,615,894 B2 | 3/2023 | Lavi et al. |
| 11,617,620 B2 | 4/2023 | Tran et al. |
| 11,633,118 B2 | 4/2023 | Freiman et al. |
| 11,638,609 B2 | 5/2023 | Sankaran et al. |
| 11,642,171 B2 | 5/2023 | Jaquet et al. |
| 11,653,833 B2 | 5/2023 | Sanders et al. |
| 11,664,128 B2 | 5/2023 | Haase et al. |
| 11,666,236 B2 | 6/2023 | Lavi et al. |
| 11,672,434 B2 | 6/2023 | Tochterman et al. |
| 11,678,853 B2 | 6/2023 | Gulsun et al. |
| 11,678,937 B2 | 6/2023 | Choi et al. |
| 11,688,502 B2 | 6/2023 | Anderson et al. |
| 11,690,518 B2 | 7/2023 | Haase et al. |
| 11,694,339 B2 | 7/2023 | Schormans et al. |
| 11,707,196 B2 | 7/2023 | Lavi et al. |
| 11,707,242 B2 | 7/2023 | Van Walsum et al. |
| 11,710,569 B2 | 7/2023 | Grass et al. |
| 11,728,037 B2 | 8/2023 | Lavi et al. |
| 11,741,574 B2 | 8/2023 | Kweon et al. |
| 11,741,602 B2 | 8/2023 | Reiber et al. |
| 11,744,472 B2 | 9/2023 | Zhao et al. |
| 11,744,544 B2 | 9/2023 | Sheehan et al. |
| 11,748,902 B2 | 9/2023 | Bai et al. |
| 11,756,195 B2 | 9/2023 | Kweon et al. |
| 11,769,254 B2 | 9/2023 | Song et al. |
| 11,776,149 B2 | 10/2023 | Wang et al. |
| 11,779,225 B2 | 10/2023 | Adiyoso |
| 11,779,233 B2 | 10/2023 | Huo et al. |
| 11,779,294 B2 | 10/2023 | Liu et al. |
| 11,786,202 B2 | 10/2023 | Yin et al. |
| 11,793,575 B2 | 10/2023 | Taylor |
| 11,803,966 B2 | 10/2023 | Denzinger et al. |
| 11,810,290 B2 | 11/2023 | Flohr et al. |
| 11,810,661 B2 | 11/2023 | Barley et al. |
| 11,816,836 B2 | 11/2023 | Isgum et al. |
| 11,816,837 B2 | 11/2023 | Lavi et al. |
| 11,826,106 B2 | 11/2023 | Hart et al. |
| 11,826,175 B2 | 11/2023 | Itu et al. |
| 11,847,547 B2 | 12/2023 | Wang et al. |
| 11,861,825 B2 | 1/2024 | Van Pelt et al. |
| 11,861,839 B2 | 1/2024 | Weese et al. |
| 11,861,851 B2 | 1/2024 | Figueroa-Alvarez et al. |
| 11,869,142 B2 | 1/2024 | Bai et al. |
| 11,883,225 B2 | 1/2024 | Sankaran et al. |
| 11,896,416 B2 | 2/2024 | Huo et al. |
| 11,901,081 B2 | 2/2024 | Huo et al. |
| 11,918,291 B2 | 3/2024 | Grass et al. |
| 11,931,195 B2 | 3/2024 | Itu et al. |
| 11,937,963 B2 | 3/2024 | Lavi et al. |
| 11,944,387 B2 | 4/2024 | Sankaran et al. |
| 11,948,677 B2 | 4/2024 | Ghose et al. |
| 11,948,695 B2 | 4/2024 | Taylor et al. |
| 11,980,492 B2 | 5/2024 | Venugopal et al. |
| 11,983,473 B2 | 5/2024 | Aben et al. |
| 11,986,280 B2 | 5/2024 | Grady et al. |
| 11,995,834 B2 | 5/2024 | Neumann et al. |
| 12,016,635 B2 | 6/2024 | Taylor |
| 12,023,189 B2 | 7/2024 | Haase et al. |
| 12,027,253 B2 | 7/2024 | Schoebinger et al. |
| 12,029,494 B2 | 7/2024 | Taylor |
| 12,035,976 B2 | 7/2024 | Choi et al. |
| 12,039,729 B2 | 7/2024 | Kweon et al. |
| 12,042,249 B2 | 7/2024 | Haase et al. |
| 12,048,575 B2 | 7/2024 | Vaillant et al. |
| 12,051,192 B2 | 7/2024 | Aben et al. |
| 12,051,202 B2 | 7/2024 | Freiman et al. |
| 12,051,497 B2 | 7/2024 | Grady et al. |
| 12,062,198 B2 | 8/2024 | Liu et al. |
| 12,067,729 B2 | 8/2024 | Thamm et al. |
| 12,079,994 B2 | 9/2024 | Lavi et al. |

(56) References Cited

U.S. PATENT DOCUMENTS

| | | |
|---|---|---|
| 12,086,981 B2 | 9/2024 | Bai et al. |
| 12,089,977 B2 | 9/2024 | Isgum et al. |
| 12,094,112 B2 | 9/2024 | Gulsun et al. |
| 12,094,188 B2 | 9/2024 | Li et al. |
| 12,094,596 B2 | 9/2024 | Wang et al. |
| 12,100,174 B2 | 9/2024 | Vaillant et al. |
| 12,100,502 B2 | 9/2024 | Cimen et al. |
| 12,109,061 B2 | 10/2024 | Itu et al. |
| 12,109,065 B2 | 10/2024 | Sheehan et al. |
| 12,112,471 B2 | 10/2024 | Viti et al. |
| 12,112,483 B2 | 10/2024 | Grady et al. |
| 12,115,014 B2 | 10/2024 | Haase et al. |
| 12,118,724 B2 | 10/2024 | Van Pelt et al. |
| 12,119,117 B2 | 10/2024 | Wang et al. |
| 12,125,217 B2 | 10/2024 | Venugopal et al. |
| 12,125,261 B2 | 10/2024 | Petersen et al. |
| 12,131,525 B2 | 10/2024 | Groth et al. |
| 12,136,209 B2 | 11/2024 | Haase et al. |
| 12,138,026 B2 | 11/2024 | Grady et al. |
| 12,138,027 B2 | 11/2024 | Lavi et al. |
| 12,142,384 B2 | 11/2024 | Rabbat et al. |
| 12,175,631 B2 | 12/2024 | Kweon et al. |
| 12,175,669 B2 | 12/2024 | Wang et al. |
| 12,176,094 B2 | 12/2024 | Taylor et al. |
| 12,178,557 B2 | 12/2024 | Grady et al. |
| 12,186,062 B2 | 1/2025 | Fonte et al. |
| 12,190,503 B2 | 1/2025 | Denzinger et al. |
| 12,190,504 B2 | 1/2025 | Aben et al. |
| 12,193,793 B2 | 1/2025 | Bouwman et al. |
| 12,198,335 B2 | 1/2025 | Haase et al. |
| 12,207,961 B2 | 1/2025 | Liu et al. |
| 12,211,208 B2 | 1/2025 | Bruch-El et al. |
| 12,211,250 B2 | 1/2025 | Kweon et al. |
| 12,217,427 B2 | 2/2025 | Schreckenberg et al. |
| 12,217,872 B2 | 2/2025 | Lavi et al. |
| 12,229,956 B2 | 2/2025 | Kim et al. |
| 12,236,600 B2 | 2/2025 | Lavi et al. |
| 12,268,545 B2 | 4/2025 | Aben |
| 12,283,052 B2 | 4/2025 | Bhowmick et al. |
| 12,315,076 B1 | 5/2025 | Farkash et al. |
| 2003/0105401 A1 | 6/2003 | Jago et al. |
| 2004/0019264 A1 | 1/2004 | Suurmond et al. |
| 2004/0066958 A1 | 4/2004 | Chen et al. |
| 2005/0041842 A1 | 2/2005 | Frakes et al. |
| 2005/0043614 A1 | 2/2005 | Huizenga et al. |
| 2005/0249327 A1 | 11/2005 | Wink et al. |
| 2005/0272992 A1 | 12/2005 | O'Donnell et al. |
| 2006/0036167 A1 | 2/2006 | Shina |
| 2006/0074285 A1 | 4/2006 | Zarkh et al. |
| 2006/0084862 A1 | 4/2006 | Suurmond et al. |
| 2006/0098010 A1 | 5/2006 | Dwyer et al. |
| 2007/0031019 A1 | 2/2007 | Lesage et al. |
| 2007/0167833 A1 | 7/2007 | Redel et al. |
| 2008/0020362 A1 | 1/2008 | Cotin et al. |
| 2008/0187199 A1 | 8/2008 | Gulsun et al. |
| 2008/0205722 A1 | 8/2008 | Schaefer et al. |
| 2009/0016483 A1 | 1/2009 | Kawasaki et al. |
| 2009/0016587 A1 | 1/2009 | Strobel et al. |
| 2009/0171321 A1 | 7/2009 | Callaghan |
| 2009/0299640 A1 | 12/2009 | Ellis et al. |
| 2009/0312648 A1 | 12/2009 | Zhang et al. |
| 2010/0010428 A1 | 1/2010 | Yu et al. |
| 2010/0017171 A1 | 1/2010 | Spilker et al. |
| 2010/0021025 A1 | 1/2010 | Hof et al. |
| 2010/0067760 A1 | 3/2010 | Zhang et al. |
| 2010/0125197 A1 | 5/2010 | Fishel |
| 2010/0160764 A1 | 6/2010 | Steinberg et al. |
| 2010/0160773 A1 | 6/2010 | Cohen et al. |
| 2010/0161023 A1 | 6/2010 | Cohen et al. |
| 2010/0220917 A1 | 9/2010 | Steinberg et al. |
| 2010/0296709 A1 | 11/2010 | Ostrovsky-Berman et al. |
| 2010/0298719 A1 | 11/2010 | Thrysoe et al. |
| 2011/0015530 A1 | 1/2011 | Misawa |
| 2011/0091377 A1 | 4/2011 | Alani et al. |
| 2011/0096907 A1 | 4/2011 | Mohamed |
| 2011/0134433 A1 | 6/2011 | Yamada |
| 2011/0135175 A1 | 6/2011 | Ostrovsky-Berman et al. |
| 2011/0142313 A1 | 6/2011 | Pack et al. |
| 2011/0182492 A1 | 7/2011 | Grass et al. |
| 2012/0014574 A1 | 1/2012 | Ferschel et al. |
| 2012/0041318 A1 | 2/2012 | Taylor |
| 2012/0041739 A1 | 2/2012 | Taylor |
| 2012/0053918 A1 | 3/2012 | Taylor |
| 2012/0053919 A1 | 3/2012 | Taylor |
| 2012/0053921 A1 | 3/2012 | Taylor |
| 2012/0059246 A1 | 3/2012 | Taylor |
| 2012/0059249 A1 | 3/2012 | Verard et al. |
| 2012/0062841 A1 | 3/2012 | Stetson et al. |
| 2012/0072190 A1 | 3/2012 | Sharma et al. |
| 2012/0075284 A1 | 3/2012 | Rivers et al. |
| 2012/0150048 A1 | 6/2012 | Kang et al. |
| 2012/0158011 A1* | 6/2012 | Sandhu .......... A61B 34/30 606/130 |
| 2012/0177275 A1 | 7/2012 | Suri |
| 2012/0230565 A1 | 9/2012 | Steinberg et al. |
| 2012/0236032 A1 | 9/2012 | Arvidsson |
| 2012/0243761 A1 | 9/2012 | Senzig et al. |
| 2013/0028490 A1 | 1/2013 | Kim et al. |
| 2013/0054214 A1 | 2/2013 | Taylor |
| 2013/0060133 A1 | 3/2013 | Kassab et al. |
| 2013/0094745 A1 | 4/2013 | Sundar |
| 2013/0158476 A1 | 6/2013 | Olson |
| 2013/0182936 A1 | 7/2013 | Yoshihara et al. |
| 2013/0202170 A1 | 8/2013 | Blezek et al. |
| 2013/0226003 A1 | 8/2013 | Edic et al. |
| 2013/0229621 A1 | 9/2013 | Stetson et al. |
| 2013/0324842 A1 | 12/2013 | Mittal et al. |
| 2014/0005535 A1 | 1/2014 | Edic et al. |
| 2014/0046642 A1 | 2/2014 | Hart et al. |
| 2014/0086461 A1 | 3/2014 | Yao et al. |
| 2014/0094693 A1 | 4/2014 | Cohen et al. |
| 2014/0094697 A1 | 4/2014 | Petroff et al. |
| 2014/0100451 A1 | 4/2014 | Tolkowsky et al. |
| 2014/0121513 A1 | 5/2014 | Tolkowsky et al. |
| 2014/0142398 A1 | 5/2014 | Patil et al. |
| 2014/0180035 A1 | 6/2014 | Anderson |
| 2014/0200867 A1 | 7/2014 | Lavi et al. |
| 2014/0249790 A1 | 9/2014 | Spilker et al. |
| 2014/0270442 A1 | 9/2014 | Jung |
| 2014/0303495 A1 | 10/2014 | Fonte et al. |
| 2014/0371578 A1 | 12/2014 | Auvray et al. |
| 2015/0092999 A1 | 4/2015 | Schmitt et al. |
| 2015/0201897 A1 | 7/2015 | Kyriakou |
| 2015/0213600 A1 | 7/2015 | Kyriakou |
| 2015/0250395 A1 | 9/2015 | Igarashi |
| 2015/0265162 A1 | 9/2015 | Lavi et al. |
| 2015/0265222 A1 | 9/2015 | Sakaguchi |
| 2015/0297373 A1 | 10/2015 | Schmitt et al. |
| 2015/0302578 A1 | 10/2015 | Grady et al. |
| 2015/0335304 A1 | 11/2015 | Lavi et al. |
| 2015/0339847 A1 | 11/2015 | Benishti et al. |
| 2015/0342551 A1 | 12/2015 | Lavi et al. |
| 2015/0374243 A1 | 12/2015 | Itu et al. |
| 2016/0007945 A1 | 1/2016 | Taylor |
| 2016/0015349 A1 | 1/2016 | Ohuchi et al. |
| 2016/0022371 A1 | 1/2016 | Sauer et al. |
| 2016/0035088 A1 | 2/2016 | Abramoff et al. |
| 2016/0035103 A1 | 2/2016 | Stawiaski et al. |
| 2016/0073928 A1 | 3/2016 | Soper et al. |
| 2016/0110866 A1 | 4/2016 | Taylor |
| 2016/0110867 A1 | 4/2016 | Taylor |
| 2016/0128661 A1 | 5/2016 | Taylor |
| 2016/0157802 A1 | 6/2016 | Anderson |
| 2016/0228000 A1 | 8/2016 | Spaide |
| 2016/0247279 A1 | 8/2016 | Lavi et al. |
| 2016/0371456 A1 | 12/2016 | Taylor et al. |
| 2017/0018116 A1 | 1/2017 | Sun et al. |
| 2017/0039736 A1 | 2/2017 | Aben et al. |
| 2017/0161897 A1 | 6/2017 | Hoffmann et al. |
| 2017/0224418 A1 | 8/2017 | Boettner et al. |
| 2017/0238904 A1 | 8/2017 | Perrey et al. |
| 2017/0258433 A1 | 9/2017 | Gulsun et al. |
| 2017/0286628 A1 | 10/2017 | Shim |
| 2017/0325770 A1 | 11/2017 | Edic et al. |

(56) References Cited

U.S. PATENT DOCUMENTS

| | | |
|---|---|---|
| 2018/0032653 A1 | 2/2018 | Aben et al. |
| 2018/0033192 A1 | 2/2018 | deVaan et al. |
| 2018/0075221 A1 | 3/2018 | Vergaro et al. |
| 2018/0089829 A1 | 3/2018 | Zhong et al. |
| 2018/0102189 A1 | 4/2018 | Hosoi et al. |
| 2018/0182096 A1 | 6/2018 | Grady et al. |
| 2018/0211386 A1 | 7/2018 | Ma et al. |
| 2018/0235561 A1 | 8/2018 | Lavi et al. |
| 2018/0243033 A1 | 8/2018 | Tran et al. |
| 2018/0268941 A1 | 9/2018 | Lavi et al. |
| 2018/0271614 A1 | 9/2018 | Kunio |
| 2018/0280088 A1 | 10/2018 | Davies |
| 2018/0315193 A1 | 11/2018 | Paschalakis et al. |
| 2018/0330507 A1 | 11/2018 | Schormans et al. |
| 2018/0344173 A1 | 12/2018 | Tu et al. |
| 2018/0344174 A9 | 12/2018 | Schmitt et al. |
| 2019/0005737 A1 | 1/2019 | Auvray et al. |
| 2019/0019347 A1 | 1/2019 | Auvray et al. |
| 2019/0038356 A1 | 2/2019 | Schmitt et al. |
| 2019/0130578 A1 | 5/2019 | Gulsun et al. |
| 2019/0156159 A1 | 5/2019 | Kopparapu |
| 2019/0172205 A1 | 6/2019 | Mao et al. |
| 2019/0180880 A1 | 6/2019 | Lavi et al. |
| 2019/0282199 A1 | 9/2019 | Merritt |
| 2019/0362494 A1 | 11/2019 | Wang et al. |
| 2019/0380593 A1 | 12/2019 | Bouwman et al. |
| 2020/0126229 A1 | 4/2020 | Lavi et al. |
| 2020/0138521 A1 | 5/2020 | Aben et al. |
| 2020/0143526 A1 | 5/2020 | Wang et al. |
| 2020/0160509 A1 | 5/2020 | Pack et al. |
| 2020/0222018 A1 | 7/2020 | van Walsum et al. |
| 2020/0226422 A1 | 7/2020 | Li et al. |
| 2020/0265958 A1 | 8/2020 | Haase et al. |
| 2020/0337664 A1 | 10/2020 | Homann et al. |
| 2020/0349708 A1 | 11/2020 | Igarashi et al. |
| 2020/0380493 A1 | 12/2020 | Morales et al. |
| 2020/0388363 A1 | 12/2020 | Docktor et al. |
| 2020/0394795 A1 | 12/2020 | Isgum et al. |
| 2021/0022617 A1 | 1/2021 | Zhao et al. |
| 2021/0035290 A1 | 2/2021 | Aben et al. |
| 2021/0042927 A1 | 2/2021 | Amis et al. |
| 2021/0085397 A1 | 3/2021 | Passerini et al. |
| 2021/0209757 A1 | 7/2021 | Min et al. |
| 2021/0244293 A1 | 8/2021 | Belleville |
| 2021/0244299 A1 | 8/2021 | Tochterman et al. |
| 2021/0244475 A1 | 8/2021 | Taylor |
| 2021/0259559 A1 | 8/2021 | Tu et al. |
| 2021/0267690 A1 | 9/2021 | Taylor |
| 2021/0272030 A1 | 9/2021 | Sankaran et al. |
| 2021/0275124 A1 | 9/2021 | Huo et al. |
| 2021/0280318 A1 | 9/2021 | Huo et al. |
| 2021/0282731 A1 | 9/2021 | Vaillant et al. |
| 2021/0282860 A1 | 9/2021 | Taylor |
| 2021/0290308 A1 | 9/2021 | Mihalef et al. |
| 2021/0298706 A1 | 9/2021 | Tu et al. |
| 2021/0298708 A1 | 9/2021 | Aben et al. |
| 2021/0334963 A1 | 10/2021 | Isgum et al. |
| 2021/0338088 A1 | 11/2021 | Bouwman et al. |
| 2021/0345889 A1 | 11/2021 | Tu et al. |
| 2021/0358634 A1 | 11/2021 | Sankaran et al. |
| 2021/0361176 A1 | 11/2021 | Huo et al. |
| 2021/0374950 A1 | 12/2021 | Gao et al. |
| 2021/0383539 A1 | 12/2021 | Haase et al. |
| 2021/0401400 A1 | 12/2021 | Sheehan et al. |
| 2022/0012876 A1 | 1/2022 | Sommer et al. |
| 2022/0012878 A1 | 1/2022 | Aoyama |
| 2022/0015730 A1 | 1/2022 | Haase et al. |
| 2022/0036646 A1 | 2/2022 | Song et al. |
| 2022/0039769 A1 | 2/2022 | M et al. |
| 2022/0054022 A1 | 2/2022 | Van Lavieren |
| 2022/0079455 A1 | 3/2022 | Haase et al. |
| 2022/0079540 A1 | 3/2022 | Sankaran et al. |
| 2022/0079563 A1 | 3/2022 | Kemp |
| 2022/0087544 A1 | 3/2022 | Schmitt et al. |
| 2022/0092775 A1 | 3/2022 | Denzinger et al. |
| 2022/0092784 A1 | 3/2022 | Tu et al. |
| 2022/0101535 A1 | 3/2022 | Thamm et al. |
| 2022/0110687 A1 | 4/2022 | Spilker et al. |
| 2022/0125398 A1 | 4/2022 | Aben |
| 2022/0151580 A1 | 5/2022 | Itu et al. |
| 2022/0156918 A1 | 5/2022 | Chitiboi et al. |
| 2022/0164950 A1 | 5/2022 | Aben et al. |
| 2022/0164953 A1 | 5/2022 | Gulsun et al. |
| 2022/0167938 A1 | 6/2022 | Grass et al. |
| 2022/0172368 A1 | 6/2022 | Lavi et al. |
| 2022/0175260 A1 | 6/2022 | Sonck et al. |
| 2022/0183655 A1 | 6/2022 | Huang et al. |
| 2022/0211280 A1 | 7/2022 | Lavi et al. |
| 2022/0211439 A1 | 7/2022 | Sankaran et al. |
| 2022/0215534 A1 | 7/2022 | Bai et al. |
| 2022/0230312 A1 | 7/2022 | Choi et al. |
| 2022/0233081 A1 | 7/2022 | Cheline et al. |
| 2022/0254028 A1 | 8/2022 | Liu et al. |
| 2022/0254131 A1 | 8/2022 | Lavi et al. |
| 2022/0261997 A1 | 8/2022 | Liu et al. |
| 2022/0262000 A1 | 8/2022 | Haase et al. |
| 2022/0273180 A1 | 9/2022 | Lavi et al. |
| 2022/0277447 A1 | 9/2022 | Wang et al. |
| 2022/0287668 A1 | 9/2022 | Gulsun et al. |
| 2022/0301156 A1 | 9/2022 | Fang et al. |
| 2022/0310265 A1 | 9/2022 | Benishti et al. |
| 2022/0319004 A1 | 10/2022 | Bruch-El et al. |
| 2022/0319116 A1 | 10/2022 | Wang et al. |
| 2022/0335612 A1 | 10/2022 | Bruch-El et al. |
| 2022/0344033 A1 | 10/2022 | Wang et al. |
| 2022/0351369 A1 | 11/2022 | Haase et al. |
| 2022/0359063 A1 | 11/2022 | Tombropoulos et al. |
| 2022/0374807 A1 | 11/2022 | Mahmood |
| 2022/0378383 A1 | 12/2022 | Chen et al. |
| 2022/0392076 A1 | 12/2022 | Seo et al. |
| 2022/0392616 A1 | 12/2022 | Ghose et al. |
| 2022/0415510 A1 | 12/2022 | Wang et al. |
| 2023/0005113 A1 | 1/2023 | Li et al. |
| 2023/0028300 A1 | 1/2023 | Lichy et al. |
| 2023/0037338 A1 | 2/2023 | Wang et al. |
| 2023/0038364 A1 | 2/2023 | Bhowmick et al. |
| 2023/0052595 A1 | 2/2023 | Langoju et al. |
| 2023/0071558 A1 | 3/2023 | Vaidya et al. |
| 2023/0084748 A1 | 3/2023 | Lavi et al. |
| 2023/0086196 A1 | 3/2023 | Chitiboi et al. |
| 2023/0095242 A1 | 3/2023 | Liu et al. |
| 2023/0097133 A1 | 3/2023 | Bai et al. |
| 2023/0097267 A1 | 3/2023 | Schwemmer et al. |
| 2023/0102646 A1 | 3/2023 | Birkhold et al. |
| 2023/0108647 A1 | 4/2023 | Tu et al. |
| 2023/0113721 A1 | 4/2023 | Kassel et al. |
| 2023/0117179 A1 | 4/2023 | Jule et al. |
| 2023/0142152 A1 | 5/2023 | Venugopal et al. |
| 2023/0142219 A1 | 5/2023 | Makino |
| 2023/0144624 A1 | 5/2023 | Venugopal et al. |
| 2023/0144795 A1 | 5/2023 | Wang et al. |
| 2023/0148977 A1 | 5/2023 | Fonte et al. |
| 2023/0177677 A1 | 6/2023 | Yuan et al. |
| 2023/0186472 A1 | 6/2023 | Kweon et al. |
| 2023/0196582 A1 | 6/2023 | Grady et al. |
| 2023/0197286 A1 | 6/2023 | Grady et al. |
| 2023/0230235 A1 | 7/2023 | Isgum et al. |
| 2023/0237648 A1 | 7/2023 | Gulsun et al. |
| 2023/0237652 A1 | 7/2023 | Flexman et al. |
| 2023/0245301 A1 | 8/2023 | Wang et al. |
| 2023/0252628 A1 | 8/2023 | Haase et al. |
| 2023/0252632 A1 | 8/2023 | Shalhon Livne et al. |
| 2023/0260107 A1 | 8/2023 | Dhatt et al. |
| 2023/0263401 A1 | 8/2023 | Escaned-Barbosa et al. |
| 2023/0277247 A1 | 9/2023 | Taylor et al. |
| 2023/0282365 A1 | 9/2023 | Lavi et al. |
| 2023/0298176 A1 | 9/2023 | Choi et al. |
| 2023/0298180 A1 | 9/2023 | Kweon et al. |
| 2023/0307144 A1 | 9/2023 | He et al. |
| 2023/0309943 A1 | 10/2023 | van Walsum et al. |
| 2023/0320789 A1 | 10/2023 | Bai et al. |
| 2023/0326127 A1 | 10/2023 | Zhong et al. |
| 2023/0334659 A1 | 10/2023 | Kuo et al. |
| 2023/0346236 A1 | 11/2023 | Lavi et al. |

(56) References Cited

U.S. PATENT DOCUMENTS

| | | |
|---|---|---|
| 2023/0352152 A1 | 11/2023 | Grady et al. |
| 2023/0355107 A1 | 11/2023 | Haase et al. |
| 2023/0355196 A1 | 11/2023 | Kang et al. |
| 2023/0355197 A1 | 11/2023 | Florent et al. |
| 2023/0360803 A1 | 11/2023 | Sankaran et al. |
| 2023/0368378 A1 | 11/2023 | Kim et al. |
| 2023/0368878 A1 | 11/2023 | Molenda |
| 2023/0386037 A1 | 11/2023 | Denzinger et al. |
| 2023/0394654 A1 | 12/2023 | Hampe et al. |
| 2023/0404525 A1 | 12/2023 | Sheehan et al. |
| 2023/0410307 A1 | 12/2023 | Nickisch et al. |
| 2024/0029529 A1 | 1/2024 | Scalisi |
| 2024/0029868 A1 | 1/2024 | Gulsun et al. |
| 2024/0046465 A1 | 2/2024 | Sharma et al. |
| 2024/0047043 A1 | 2/2024 | Flexman et al. |
| 2024/0050159 A1 | 2/2024 | Hart et al. |
| 2024/0065772 A1 | 2/2024 | Levi et al. |
| 2024/0078676 A1 | 3/2024 | Van Pelt et al. |
| 2024/0096479 A1 | 3/2024 | Kraus et al. |
| 2024/0099589 A1 | 3/2024 | Lavi et al. |
| 2024/0099683 A1 | 3/2024 | Cimen et al. |
| 2024/0104719 A1 | 3/2024 | Gulsun et al. |
| 2024/0126958 A1 | 4/2024 | Aben et al. |
| 2024/0130674 A1 | 4/2024 | Sonck et al. |
| 2024/0130796 A1 | 4/2024 | Song et al. |
| 2024/0153087 A1 | 5/2024 | Lavi et al. |
| 2024/0164865 A1 | 5/2024 | Kottenstette et al. |
| 2024/0169540 A1 | 5/2024 | Bouwman et al. |
| 2024/0185485 A1 | 6/2024 | Salomon et al. |
| 2024/0185509 A1 | 6/2024 | Kovler et al. |
| 2024/0206838 A1 | 6/2024 | Lavi et al. |
| 2024/0212159 A1 | 6/2024 | Katzmann et al. |
| 2024/0215937 A1 | 7/2024 | Itu et al. |
| 2024/0221355 A1 | 7/2024 | Kweon et al. |
| 2024/0252258 A1* | 8/2024 | Avall ............... A61B 34/25 |
| 2024/0260919 A1 | 8/2024 | Venugopal et al. |
| 2024/0273723 A1 | 8/2024 | Tison et al. |
| 2024/0315777 A1 | 9/2024 | Choi et al. |
| 2024/0324870 A1 | 10/2024 | Wong et al. |
| 2024/0346644 A1 | 10/2024 | Venugopal |
| 2024/0346648 A1 | 10/2024 | Kim et al. |
| 2024/0366409 A1 | 11/2024 | Xiang et al. |
| 2024/0374148 A1 | 11/2024 | Haase et al. |
| 2024/0386547 A1 | 11/2024 | Nadakuditi et al. |
| 2024/0386652 A1 | 11/2024 | Grady et al. |
| 2024/0387045 A1 | 11/2024 | Lynch et al. |
| 2024/0394875 A1 | 11/2024 | Van Der Horst et al. |
| 2024/0394996 A1 | 11/2024 | Hitschrich et al. |
| 2024/0404031 A1 | 12/2024 | Auvray et al. |
| 2024/0404057 A1 | 12/2024 | Florent et al. |
| 2024/0407656 A1 | 12/2024 | This et al. |
| 2024/0412365 A1 | 12/2024 | Kim |
| 2024/0420331 A1 | 12/2024 | Kim et al. |
| 2024/0423575 A1 | 12/2024 | Itu et al. |
| 2024/0428477 A1 | 12/2024 | Salehi et al. |
| 2025/0022133 A1 | 1/2025 | Wissel et al. |
| 2025/0032079 A1 | 1/2025 | Gomez et al. |
| 2025/0054628 A1 | 2/2025 | Anin et al. |
| 2025/0069347 A1 | 2/2025 | Lavi et al. |
| 2025/0072971 A1 | 3/2025 | Jeong et al. |
| 2025/0072972 A1 | 3/2025 | Won et al. |
| 2025/0078261 A1 | 3/2025 | DePaoli et al. |
| 2025/0078268 A1 | 3/2025 | Kim et al. |
| 2025/0078288 A1 | 3/2025 | Pedrizzetti et al. |
| 2025/0082218 A1 | 3/2025 | Fonte et al. |
| 2025/0086794 A1 | 3/2025 | Aben et al. |
| 2025/0090032 A1 | 3/2025 | Bouwman et al. |
| 2025/0090034 A1 | 3/2025 | Grady et al. |
| 2025/0099060 A1 | 3/2025 | Turcea et al. |
| 2025/0104228 A1 | 3/2025 | Neumann et al. |
| 2025/0117941 A1 | 4/2025 | Bruch-El et al. |
| 2025/0124578 A1 | 4/2025 | Kim et al. |
| 2025/0127473 A1 | 4/2025 | Ku |
| 2025/0131567 A1 | 4/2025 | Kitslaar et al. |
| 2025/0131568 A1 | 4/2025 | Lavi et al. |
| 2025/0166196 A1 | 5/2025 | Lavi et al. |
| 2025/0166843 A1 | 5/2025 | Lavi et al. |

FOREIGN PATENT DOCUMENTS

| | | |
|---|---|---|
| CN | 113837985 | 12/2021 |
| CN | 113935976 | 1/2022 |
| EP | 1396274 | 3/2004 |
| EP | 2163272 | 3/2010 |
| EP | 2633815 A1 | 9/2013 |
| EP | 2779907 | 9/2014 |
| EP | 2873371 | 5/2015 |
| EP | 3125764 | 2/2017 |
| EP | 2633815 B1 | 6/2017 |
| EP | 3363350 | 8/2018 |
| EP | 2977922 | 3/2019 |
| EP | 3460688 | 3/2019 |
| EP | 3477551 | 5/2019 |
| EP | 3763285 | 1/2021 |
| EP | 3847956 | 7/2021 |
| EP | 2776960 | 9/2021 |
| EP | 3534372 | 9/2021 |
| EP | 3871184 | 9/2021 |
| EP | 3881758 | 9/2021 |
| EP | 3884868 | 9/2021 |
| EP | 3282380 | 11/2021 |
| EP | 3282381 | 11/2021 |
| EP | 3903672 | 11/2021 |
| EP | 3912139 | 11/2021 |
| EP | 3664026 | 2/2022 |
| EP | 3945469 | 2/2022 |
| EP | 3949860 | 2/2022 |
| EP | 3951705 | 2/2022 |
| EP | 3076854 | 4/2022 |
| EP | 3979259 | 4/2022 |
| EP | 3982324 | 4/2022 |
| EP | 3258446 | 5/2022 |
| EP | 4002288 | 5/2022 |
| EP | 4026143 | 7/2022 |
| EP | 4026491 | 7/2022 |
| EP | 4026492 | 7/2022 |
| EP | 4029438 | 7/2022 |
| EP | 3298959 | 9/2022 |
| EP | 3989828 | 11/2022 |
| EP | 3157411 | 12/2022 |
| EP | 3606437 | 12/2022 |
| EP | 4104765 | 12/2022 |
| EP | 4113434 | 1/2023 |
| EP | 4131150 | 2/2023 |
| EP | 4137053 | 2/2023 |
| EP | 4145391 | 3/2023 |
| EP | 4156112 | 3/2023 |
| EP | 3169237 | 4/2023 |
| EP | 4160528 | 4/2023 |
| EP | 4160543 | 4/2023 |
| EP | 4170579 | 4/2023 |
| EP | 4186417 | 5/2023 |
| EP | 3403582 | 6/2023 |
| EP | 3743883 | 6/2023 |
| EP | 3989832 | 8/2023 |
| EP | 4220553 | 8/2023 |
| EP | 4224416 | 8/2023 |
| EP | 3652747 | 9/2023 |
| EP | 4104766 | 9/2023 |
| EP | 4238500 | 9/2023 |
| EP | 3602485 | 10/2023 |
| EP | 4064181 | 11/2023 |
| EP | 3602487 | 12/2023 |
| EP | 4300419 | 1/2024 |
| EP | 4312184 | 1/2024 |
| EP | 3404667 | 2/2024 |
| EP | 3878366 | 4/2024 |
| EP | 3457413 | 5/2024 |
| EP | 4005472 | 5/2024 |
| EP | 4369290 | 5/2024 |
| EP | 4176814 | 7/2024 |
| EP | 4413927 | 8/2024 |
| EP | 4418206 | 8/2024 |

(56) References Cited

FOREIGN PATENT DOCUMENTS

| | | |
|---|---|---|
| EP | 3846176 | 9/2024 |
| EP | 3881758 B1 | 9/2024 |
| EP | 3564963 | 10/2024 |
| EP | 4056110 | 10/2024 |
| EP | 4439476 | 10/2024 |
| EP | 3644857 | 2/2025 |
| JP | H07-271976 | 10/1995 |
| JP | H08-131429 | 5/1996 |
| JP | 2003-508152 | 3/2003 |
| JP | 2003-514600 | 4/2003 |
| JP | 2004-243117 | 9/2004 |
| JP | 2007-502644 | 2/2007 |
| JP | 2007-325920 | 12/2007 |
| JP | 4177217 B2 | 11/2008 |
| JP | 2010-042247 | 2/2010 |
| JP | 2011-212314 | 10/2011 |
| JP | 2012-043498 | 3/2012 |
| JP | 2013-090799 | 5/2013 |
| JP | 2010-505493 | 7/2013 |
| JP | 2013-534154 | 9/2013 |
| JP | 2014-064915 | 4/2014 |
| JP | 2014-128631 | 7/2014 |
| JP | 2015-527901 | 9/2015 |
| JP | 2017-516535 | 6/2017 |
| JP | 2018-057835 | 4/2018 |
| JP | 2018-089364 | 6/2018 |
| NL | 2012324 | 8/2015 |
| WO | WO 2001/21057 | 3/2001 |
| WO | WO 2007/066249 | 6/2007 |
| WO | WO 2010/033971 | 3/2010 |
| WO | WO 2011/038044 | 3/2011 |
| WO | WO 2011/039685 | 4/2011 |
| WO | WO 2012/021037 | 2/2012 |
| WO | WO 2012/021307 | 2/2012 |
| WO | WO 2012/043498 | 4/2012 |
| WO | WO 2012/173697 | 12/2012 |
| WO | WO 2013/102880 | 7/2013 |
| WO | WO 2014/027692 | 2/2014 |
| WO | WO 2014/064702 | 5/2014 |
| WO | WO 2014/111927 | 7/2014 |
| WO | WO 2014/111929 | 7/2014 |
| WO | WO 2014/111930 | 7/2014 |
| WO | WO 2015/017420 | 2/2015 |
| WO | WO 2015/059706 | 4/2015 |
| WO | WO 2016/135330 | 9/2016 |
| WO | WO 2016/161356 | 10/2016 |
| WO | WO 2017/056007 | 4/2017 |
| WO | WO 2017/199245 | 11/2017 |
| WO | WO 2017/199246 | 11/2017 |
| WO | WO 2017/200381 | 11/2017 |
| WO | WO 2018/060529 | 4/2018 |
| WO | WO 2018/165478 | 9/2018 |
| WO | WO 2018/178272 | 10/2018 |
| WO | WO 2019/002510 | 1/2019 |
| WO | WO 2019/101630 | 5/2019 |
| WO | WO 2020/053099 | 3/2020 |
| WO | WO 2020/084101 | 4/2020 |
| WO | WO 2020/201942 | 10/2020 |
| WO | WO 2020/212459 | 10/2020 |
| WO | WO 2021/016071 | 1/2021 |
| WO | WO 2021/059165 | 4/2021 |
| WO | WO 2021/175039 | 9/2021 |
| WO | WO 2021/191909 | 9/2021 |
| WO | WO 2021/221949 | 11/2021 |
| WO | WO 2021/258835 | 12/2021 |
| WO | WO 2022/000727 | 1/2022 |
| WO | WO 2022/000729 | 1/2022 |
| WO | WO 2022/000733 | 1/2022 |
| WO | WO 2022/000734 | 1/2022 |
| WO | WO 2022/000976 | 1/2022 |
| WO | WO 2022/000977 | 1/2022 |
| WO | WO 2022/002765 | 1/2022 |
| WO | WO 2022/019765 | 1/2022 |
| WO | WO 2022/069208 | 4/2022 |
| WO | WO 2022/086326 | 4/2022 |
| WO | WO 2022/109902 | 6/2022 |
| WO | WO 2022/109903 | 6/2022 |
| WO | WO 2022/109904 | 6/2022 |
| WO | WO 2022/109907 | 6/2022 |
| WO | WO 2022/136043 | 6/2022 |
| WO | WO 2022/161239 | 8/2022 |
| WO | WO 2022/167940 | 8/2022 |
| WO | WO 2022/184736 | 9/2022 |
| WO | WO 2022/199238 | 9/2022 |
| WO | WO 2022/235162 | 11/2022 |
| WO | WO 2022/261641 | 12/2022 |
| WO | WO 2023/277283 | 1/2023 |
| WO | WO 2023/057296 | 4/2023 |
| WO | WO 2023/099144 | 6/2023 |
| WO | WO 2023/104538 | 6/2023 |
| WO | WO 2023/115576 | 6/2023 |
| WO | WO 2023/146401 | 8/2023 |
| WO | WO 2023/152688 | 8/2023 |
| WO | WO 2023/191380 | 10/2023 |
| WO | WO 2023/224369 | 11/2023 |
| WO | WO 2022/228464 | 12/2023 |
| WO | WO 2024/022809 | 2/2024 |
| WO | WO 2024/023048 | 2/2024 |
| WO | WO 2024/034748 | 2/2024 |
| WO | WO 2024/074309 | 4/2024 |
| WO | WO 2024/083538 | 4/2024 |
| WO | WO 2024/121060 | 6/2024 |
| WO | WO 2024/151926 | 7/2024 |
| WO | WO 2024/156859 | 8/2024 |
| WO | WO 2024/160583 | 8/2024 |
| WO | WO 2024/177428 | 8/2024 |
| WO | WO 2024/200348 | 10/2024 |
| WO | WO 2024/230129 | 11/2024 |
| WO | WO 2024/240737 | 11/2024 |
| WO | WO 2024/244323 | 12/2024 |
| WO | WO 2024/254971 | 12/2024 |
| WO | WO 2024/238747 | 1/2025 |
| WO | WO 2025/002905 | 1/2025 |
| WO | WO 2025/023995 | 1/2025 |
| WO | WO 2025/032545 | 2/2025 |
| WO | WO 2025/032546 | 2/2025 |
| WO | WO 2025/039396 | 2/2025 |
| WO | WO 2025/042123 | 2/2025 |
| WO | WO 2025/044005 | 3/2025 |
| WO | WO 2025/055208 | 3/2025 |
| WO | WO 2025/060217 | 3/2025 |

OTHER PUBLICATIONS

Andriotis et al., "A new method of three-dimensional coronary artery reconstruction from X-Ray angiography: Validation against a virtual phantom and multislice computed tomography", Catheterization and Cardiovascular Interventions, vol. 71:28-43 (2008).

Barnea, "Model-based estimation of coronary vessel diameter in angiographic images", Proceedings of the 20th Annual International Conference of the IEEE Engineering in Medicine and Biology Society, vol. 20:513-516 (1998).

Barratt et al., "Reconstruction and quantification of the carotid artery bifurcation from 3-D ultrasound images", IEEE Transactions on Medical Imaging, vol. 23(5):567-583 (2004).

Barrett et al., "Interactive live-wire 1-3 boundary extraction", Medical Image Analysis, Oxford University Press, vol. 1(4):331-341 (1997).

Bullitt et al., "Determining malignancy of brain tumors by analysis of vessel shape", Medical Image Computing and Computer-Assisted Intervention, MICCAI 2004 Conference Proceedings, Lecture notes in Computer Science, LNCS, 3217:645-653 (2004).

Caiati et al., "New noninvasive method for coronary flow reserve assessment: Contrast-enhanced transthoracic second harmonic echo doppler", Circulation, vol. 99:771-778 (1999).

Caiati et al., "Detection, location, and severity assessment of left anterior descneding coronary artery stenoses by means of contrast-enhanced transthoracic harmonic echo dopper", European Heart Journal, vol. 30:1797-1806 (2009).

Chen et al., "3-D reconstruction of coronary arterial tree to optimize angiographic visualization", IEEE Transactions on Medical Imaging, vol. 19(4):318-336 (2000).

(56) References Cited

OTHER PUBLICATIONS

Chung, "Image segmentation methods for detecting blood vessels in angiography", 2006 9th International Conference on Control, Automation, Robotics and Vision, Singapore, pp. 1-6 (2006).
Dickie et al., "Live-vessel: interactive vascular image segmentation with simultaneous extraction of optimal medial and boundary paths", Technical Report TR 2009-23, School of Computing Science, Simon Fraser University, Burnaby, BC, Canada, Nov. 2009.
Frangi et al., "Multiscale vessel and enhancement filtering", Medical Image Computing and Computer-Assisted Intervention, MICCA '98 Lecture Notes in Computer Science, vol. 1496:130-137 (1998).
Fraz, "Blood vessel segmentation methodologies, in retinal images—a survey", Computer Methods and Programs in Biomedicine, vol. 108:407-433 (2012).
Fusejima, "Noninvasive measurement of coronary artery blood flow using combined two-dimensional and doppler echocardiography", JACC vol. 10(5):1024-1031 (1987).
Google Maps Tips 10: Drag-and-Drop Alter Your Directions, Feb. 18, 2015, XP093093278, retrieved from the internet: https://www.youtube.com/watch?v=8pYqjiZh6gw, retrieved on Oct. 19, 2023.
Hawkes et al., "Validation of volume blood flow measurements using three-dimensional distance-concentration functions detived from digital X-Ray angiograms", Investigative Radiology, vol. 29(4):434-442 (1994).
Hoffmann et al., "Determination of instantaneous and average blood flow rates from digital angiograms of vessel phantoms using distance-density curves", Investigative Radiology, vol. 26(3):207-212 (1991).
Holdsworth et al., "Quantitative angiographic blood-flow measurement using pulsed intra-arterial injection", Medical Physics, vol. 26(10):2168-2175 (1999).
Huo et al., "Intraspecific scaling laws of vascular trees", J.R. Soc. Interface vol. 9:190-200 (2012).
Janssen et al., "New approaches for the assessment of vessel sizes in quantitative (cardio-)vascular X-ray analysis", Int J Cardiovasc Imaging vol. 26:259-271 (2010).
Jiang et al., "Vascular tree reconstruction by minimizing a physiological functional cost", 2010 IEEE Computer Society Conference on Computer Vision and Pattern Recognition—workshops, San Francisco, CA, pp. 178-185, doi: 10.1109/CVPRW.2010.5543593.
Kappetein et al., "Current percutaneous coronary intervention and coronary artery bypass grafting practices for three-vessel and left main coronary artery disease: Insights from the SYNTAX run-in phase", European Journal of Cardio-Thoracic Surgery, vol. 29:486-491 (2010).
Kass et al., "Snakes: active contour models", Int. J. Comput. Vis. vol. 1:321-331 (1987).
Kern, "Serial lesion FFR made simple", Cath Lab Digest, vol. 20(9)(2012), in 2 pages, [retrieved on on Sep. 25, 2024], retrieved from the internet: https://www.hmpgloballearningnetwork.com/site/cathlab/articles/serial-lesion-ffr-made-simple.
Kirkeeide, "Coronary obstructions, morphology and physiologic significance", Quantitative Coronary Arteriography, Chap. 11:229-244 (1991).
Lethen et al., "Validation of noninvasive assessment of coronary flow velocity reserve in the right coronary artery—A comparison of transthoracic echocardiographic results with intracoronary doppler flow wire measurements", European Heart Journal, vol. 24:1567-1575 (2003).
Li et al., "Minimization of region-scalable fitting energy for image segmentation", in IEEE Transactions on Image Processing, vol. 17(10):1940-1949 (2008).
Marchenko, et al., "Vascular editor: from angiographic images to 3D vascular models", Journal of Digital Imaging, vol. 23:386-398 (2010).
Meimoun et al., "Non-invasive assessment of coronary flow and coronary flow reserve by transthoracic doppler echocardiography: a magic tool for the real world", European Journal of Echocardiography, vol. 9:449-457 (2008).
Mercer-Rosa et al., "Illustration of the additional value of real-time 3-dimensional echocardiography to conventional transthoracic and transesophageal 2-dimensional echocardiography in imaging muscular ventricular septal defects: does this have any impact on individual patient treatment", Journal of the American Society of Echocardiography, vol. 19(12):1511-1519 (2006).
Molloi et al., "Quantification of fractional flow reserve using angiographic image data", World Congress on Medical Physics and Biomedical Engineering, Munich, Germany, Sep. 7-12, 2009.
Molloi et al., "Estimation of coronary artery hyperemic blood flow based on arterial lumen vol. using angiographic images", Int J Cardiovasc Imaging, vol. 28:1-11 (2012).
Neng et al., "Pre-stenting angiography-FFR based physiological map provides virtual intervention and predicts physiological and clinical outcomes", Catheterization and Cardio vascular Interventions, Wiley-Liss, New York, NY, vol. 101(6):1053-1061 (2023).
Ng et al., "Novel QCA methodologies and angiographic scores", Int J Cardiovasc Imaging vol. 27:157-165 (2011).
Nijjer et al., "Pre-angioplasty instantaneous wave-free ratio pullback provides virtual intervention and predicts hemodynamic outcome for serial lesions and diffuse coronary artery disease", JACC: Cardiovascular Interventions, vol. 7(12):1386-1396 (2014).
Pellot et al., "A 3D reconstruction of vascular structures from two X-Ray angiograms using an adapted simulated annealing algorithm", IEEE Transactions of Medical Imaging, vol. 13(1):48-60 (1994).
Pijls et al., "Experimental basis of determining maximum coronary, myocardial, and collateral blood flow by pressure measurements for assessing functional stenosis severity before and after percutaneous transluminal coronary angioplasty", Circulation, vol. 87:1354-1367 (1993).
Pinho et al., "Assessment and stenting of tracheal stenosis using deformable shape models", Medical Image Analysis, vol. 15(2):250-266 (2010).
Polytimi et al., "Close to transplant renal artery stenosis and percutaneous transluminal treatment", Journal of Transplantation, vol. 2011, 7 pages (2011).
Rabbat et al., "Interpreting results of coronary computed tomography angiography-derived fractional flow reserve in clinical practice", Journal of Cardiovascular Computed Tomography, vol. 11(5):1-6 (2017).
Rimac et al., "Clinical value of post-percutaneous coronary intervention fractional flow reserve value: A systematic review and meta-analysis", Am Heart J. vol. 183:1-9 (2017).
Sarwal et al., "3-D reconstruction of coronary arteries", Proceedings of the 16th Annual Intl.|Conference of the IEEE Engineering in Medicine and Biology Society, Engineering Advances: New Opportunities for Biomedical Engineers, Nov. 3, 1994, pp. 504-505.
Sato et al., "A viewpoint determination system for stenosis diagnosis and quantification in coronary angiogrphic image acquisition", IEEE Transactions on Medical Imaging, vol. 17(1):121-137 (1998).
Seifalian et al., "A new algorithm for deriving pulsatile blood flow waveforms tested using simulated dynamic angiographic data", Neuroradiology, vol. 31:263-269 (1989).
Seifalian et al., "Blood flow measurements using 3D distance-concentration functions derived from digital x-ray angiograms", Cardiovascular Imaging, Chap. 33:425-442 (1996).
Seifalian et al., "Validation of a quantitative radiographic technique to estimate pulsatile blood flow waveforms using digital subtraction angiographic data", Journal of Biomedical Engineering, vol. 13(3): 225-233 (1991).
Shang et al., "Vascular active contour for vessel tree segmentation", in IEEE Transactions on Biomedical Engineering, vol. 58(4):1023-1032 (2011).
Shpilfoygel et al., "Comparison of methods for instantaneous angiographic blood flow measurement", Medical Physics, vol. 26(6):862-871 (1999).
Sianos et al., "The SYNTAX score: an angiographic tool grading the complexity of coronary artery disease", Euro Intervention, vol. 1(2):219-227 (2005).
Siogkas et al., "Quantification of the effect of percutaneous coronary angioplasty on a stenosed right coronary artery", 2010 10th IEEE Intl. Conference on Information Technology and Applications in Biomedicine, Nov. 3-5, 210, pp. 1-4 (2010).

(56) References Cited

OTHER PUBLICATIONS

Slomka et al., "Fully automated wall motion and thickening scoring system for myocardial perfusion SPECT: Method development and validation in large population", Journal of Nuclear Cardiology, vol. 19(2):291-302 (2012).
Sprague et al., "Coronary x-ray angiographic reconstruction and image orientation", Medical Physics, vol. 33(3):707-718 (2006).
Sun et al., "Coronary CT angiography: current status and continuing challenges", The British Journal of Radiology, vol. 85:495-510 (2012).
Takarada et al., "An angiographic technique for coronary fractional flow reserve measurement: in vivo validation", International Journal of Cardiovascular Imaging, published online pp. 1-10, Aug. 31, 2012.
Termeer et al., "Visualization of myocardial perfusion derived from coronary anatomy", IEEE Transactions on Visualization and Computer Graphics, vol. 14(6):1595-1602 (2008).
Tomasello et al., "Quantitative coronary angiography in the interventional cardiology", Advances in the Diagnosis of Coronary Atherosclerosis, Chap. 14:255-272 (2011).
Tsigkas et al., "Rapid and precise computation of fractional flow reserve from routine two-dimensional coronary angiograms based on fluid mechanics: The pilot FFR2D study", Journal of Clinical Medicine, vol. 13:1-13 (2024).
Tu et al., Assessment of obstruction length and optimal viewing angle from biplane X-ray angiograms, Int J Cardiovasc Imaging, vol. 26:5-17 (2010).
Tu et al., "In vivo assessment of optimal viewing angles from X-ray coronary angiography", EuroIntervention, vol. 7:112-120 (2011).
Tu et al., "In vivo assessment of bifurcation optimal viewing angles and bifurcation angles by three-dimentional (3D) quantitative coronary angiography", Int J Cardiovasc Imaging, published online Dec. 15, 2011, in 9 pages.
Tu et al., "The impact of acquisition angle differences on three-dimensional quantitative coronary angiography", Catheterization and Cardiovascular Interventions, vol. 78:214-222 (2011).
Tuinenburg et al., "Dedicated bifurcation analysis: basic principles", Int J Cardiovasc Imaging, vol. 27:167-174 (2001).
Voci et al., "Coronary flow: a new asset for the echo lab?", European Heart Journal, vol. 25:1867-1879 (2004).
Volcano Corporation, iFR instant wave-free Ratio™, "An introduction to iFR Scout™ Pullback Measurements, Moving from Justified PCI to Guided PCI", 2015, in 11 pages, [retrieved on Aug. 29, 2024]. Retrieved from the Internet <URL: https://www.usa.philips.com/c-dam/b2bhc/master/education-resources/technologies/igt/iFR-Scout-In-Service.pdf>.
Weickert et al., "A scheme for coherence-enhancing diffusion filtering with optimized rotation invariance", Computer Vision, Graphics, and Pattern Recognition Group, Technical Report, Computer Science Series, pp. 1-20 (2000).
Weickert, "Anisotropic diffusion in image processing", ECMI, published by Teubner Stuttgart, Germany, 181 pages (2008).
Weickert et al., "A scheme for coherence-enhancing diffusion filtering with optimized rotation invariance", Journal of Visual Communication and Image Representation, vol. 13(1-2):103-118 (2002).
Wang et al., "Optimal viewing angle determination for multiple vessel segments in coronary angiographic image", IEEE Transactions on Nuclear Science, vol. 61(3):1290-1303 (2014).
Wang et al., "Global optimization angiographic viewing angles for coronary arteries with multiple segments", 35th Annual International Conference of the IEEE EMBS, pp. 2640-2643, Osaka, Japan, Jul. 3-7, 2013.
Wong et al., "Quantification of fractional flow reserve based on angiographic image data", The International Journal of Cardiac Imaging, vol. 28(1):13-22 (2012).
Wong et al., "Determination of fractional flow reserve (FFR) based on scaling laws: a simulation study", Physics in Medicine and Biology, vol. 53:3995-4011 (2008).
Wong et al., "Automated technique for angiographic determination of coronary blood flow and lumen volume", Acad. Radiol. vol. 13:186-194 (2006).
Xu et al., "Snakes, shapes, and gradient vector flow", IEEE Transactions on Image Processing, vol. 7:359-369 (1998).
Yang et al., "Novel approach for 3-D reconstruction of coronary arteries from two uncalibrated angiographic images", IEEE Transactions on Image Processing, vol. 18(7):1563-1572 (2009).
Youssef et al., "Role of computed tomography coronary angiography in the detection of vulnerable plaque, where does it stand among others?", Angiology, vol. 1(2):1000111-1-1000111-8 (2013).
Zhang et al., "Quantification of coronary microvascular resistance using angiographic images for volumetric blood flow measurement: in vivo validation", Am J Physio Heart Circ vol. 300(6):H2096-H2104 (2011).
International Search Report and Written Opinion in application No. PCT/IB2024/057718, mailed on Nov. 15, 2024, in 16 pages.
Hwang et al., "Diagnostic performance of resting and hyperemic invasive physiological indices to define myocardial ischemia", JACC: Cardiovascular Interventions, vol. 10(8):751-760 (2017).
Yang et al., "Attention-based multi-fidelity machine learning model for fractional flow reserve assessment", Computer Methods in Applied Mechanics and Engineering, vol. 432(117338):1-16 (2024).
Fearon et al., "Accuracy of fractional flow reserve derived from coronary angiography", Circulation, vol. 139:477-484 (2019).
Kornowski et al., "Online angiography image-based FFR assessment during coronary catheterization: A single-center study", The Journal of Invasive Cardiology, vol. 30:1-6 (2018).
Omori et al., "Angiogram based fractional flow reserve in patients with dual/triple vessel coronary artery disease", International Journal of Cardiology, https://doi.org/10.1016/j.ijcard.2019301-072, in 6 pages (2019).
Pellicano et al., "Validation study of image-based fractional flow reserve during coronary angiography", Circ Cardiovasc Interv, downloaded on Sep. 16, 2017 at https://circinterventions.ahajournals.org, pp. 1-12 (2017).
The CathWorks Ffrangio™ System, The Wayback Machine, https://web.archive.org/web/20220424014347/https://www.cahtworks/cathworks-ffrangio/, accessed on Apr. 29, 2025, in 9 pages (2022).
Witberg et al., "Diagnostic performance of angiogram-derived fractional flow reserve", JACC: Cardiovascular Interventions, vol. 13(4):488-497 (2020).

* cited by examiner

ENHANCED USER INTERFACE AND CROSSTALK ANALYSIS FOR VASCULAR INDEX MEASUREMENT

CROSS-REFERENCE TO RELATED APPLICATIONS

This application claims priority to, and is a continuation of, International Patent App. No. PCT/IB2024/057718 titled "ENHANCED USER INTERFACE AND CROSSTALK ANALYSIS FOR VASCULAR INDEX MEASUREMENT" and filed on Aug. 9, 2024, which claims priority to U.S. Prov. Patent App. No. 63/518,529 titled "ENHANCED USER INTERFACE AND CROSSTALK ANALYSIS FOR VASCULAR INDEX MEASUREMENT" and which was filed on Aug. 9, 2023. The entire disclosure of each of the above-identified applications is hereby incorporated herein by reference in its entirety.

BACKGROUND

Cardiovascular disease (CVD) is a leading cause of morbidity and mortality, with an estimated 244.1 million people worldwide with CVD, particularly due to the subsect of CVD, coronary artery disease (CAD). CAD may involve a prolonged asymptomatic developmental phase, with clinical manifestations often resulting in angina pectoris, acute myocardial infarction (MI), or cardiac death. The underlying mechanism that may cause CAD involves atherosclerosis of the coronary arteries. Atherosclerosis is a plaque buildup that narrows the coronary arteries and decreases blood flow to the heart, resulting in ischemia or coronary stenosis.

Revascularization may be the preferred therapy for patients with moderate to severe ischemia or stenosis, resulting in significant improvements for the patient due. Revascularization strategies include many techniques such as open-heart surgery, coronary artery bypass grafting (CABG), and percutaneous coronary intervention (PCI) methods such as balloon angioplasty, bare-meta stents (BMS), and first- and second-generation drug-eluting stents (DES). The severity of CAD can be assessed through vascular computer models.

SUMMARY

The disclosure generally contemplates systems and methods for determining the effectiveness of percutaneous coronary intervention (PCI) using non-invasive techniques based on cross-talk analysis.

In some aspects, the techniques described herein relate to a method implemented by a system of one or more processors, the method including: accessing a cardiac model of a portion of a patient's heart, the portion including one or more vessels of the patient's heart, and the cardiac model indicating a plurality of lesions along a length of at least one of the vessels; obtaining, based on the cardiac model for the lesions, respective positions along the length for which the lesions are associated with index drops, wherein the index drops are with respect to an index indicative of vascular function; and causing presentation of a user interface, wherein the user interface: presents a graph mapping individual positions along the length of the vessel and values of the index indicative of vascular function, presents individual user interface elements enabling nulling of individual lesions, and updates the graph in response to received user input to one or more of the user interface elements, wherein the user input nulls effects of one or more lesions.

In some aspects, the techniques described herein relate to a method, wherein the user interface elements are toggles.

In some aspects, the techniques described herein relate to a method, wherein the plurality of lesions includes at least one user-identified lesion.

In some aspects, the techniques described herein relate to a method, wherein the plurality of lesions further includes at least one automatically-identified lesion that meets an index drop threshold.

In some aspects, the techniques described herein relate to a method, wherein the cardiac model is a three-dimensional model generated based on angiographic images.

In some aspects, the techniques described herein relate to a method, wherein the index indicative of vascular function is a fractional flow reserve value.

In some aspects, the techniques described herein relate to a method, wherein the graph is a line.

In some aspects, the techniques described herein relate to a method, wherein the user input triggers a determination of index drops associated with remaining lesions.

In some aspects, the techniques described herein relate to a method, wherein nulling a lesion cause updating of diameters of the vessel which are associated with the lesion, and wherein the updated diameters are updated to cause index drops less than a threshold.

In some aspects, the techniques described herein relate to a method, wherein the user interface updates to include an updated index indicative of vascular function.

In some aspects, the techniques described herein relate to a system including one or more processors and non-transitory computer storage media storing instructions that when executed by the one or more processors, cause the one or more processors to perform the method.

In some aspects, the techniques described herein relate to non-transitory computer storage media storing instructions that when executed by a system.

In some aspects, the techniques described herein relate to a method implemented by a system of one or more processors, the method including: accessing a cardiac model of a portion of a patient's heart, the portion including one or more vessels of the patient's heart, and the cardiac model indicating a plurality of lesions along a length of at least one of the vessels; obtaining, based on the cardiac model for the lesions, respective positions along the length for which the lesions are associated with index drops, wherein the index drops are with respect to an index indicative of vascular function for the vessels; and causing presentation of a user interface, wherein the user interface: presents individual user interface elements enabling nulling of individual lesions, and updates the index in response to received user input to one or more of the user interface elements, wherein the user input nulls effects of one or more lesions.

In some aspects, the techniques described herein relate to a method, wherein the user interface elements are toggles.

In some aspects, the techniques described herein relate to a system including one or more processors and non-transitory computer storage media storing instructions that when executed by the one or more processors, cause the one or more processors to perform the method.

In some aspects, the techniques described herein relate to non-transitory computer storage media storing instructions that when executed by a system.

In some aspects, the techniques described herein relate to a method implemented by a system including one or more processors, the method including: accessing a cardiac model of a portion of a patient's heart, the portion including one or more vessels of the patient's heart, and the cardiac model indicating a plurality of lesions along a length of at least one of the vessels; obtaining, based on the cardiac model for the lesions, respective positions along the length for which the lesions are associated with index drops, wherein the index drops are with respect to an index indicative of vascular function for the vessels; and based on information indicating that a particular lesion of the plurality of lesions is to be nulled, updating the index indicative of vascular function to null effects of the particular lesion.

In some aspects, the techniques described herein relate to a method, wherein updating the index is based on addressing crosstalk associated with remaining lesions.

In some aspects, the techniques described herein relate to a method, wherein the particular lesion is downstream from one or more remaining lesions.

In some aspects, the techniques described herein relate to a method, wherein the particular lesion is between adjacent of the lesions.

In some aspects, the techniques described herein relate to a system including one or more processors and non-transitory computer storage media storing instructions that when executed by the one or more processors, cause the one or more processors to perform the method.

In some aspects, the techniques described herein relate to non-transitory computer storage media storing instructions that when executed by a system.

The systems, methods, techniques, modules, and devices of this disclosure each have several innovative aspects, no single one of which is solely responsible for the desirable attributes disclosed herein.

DETAILED DESCRIPTION

Overview

Figure 1:
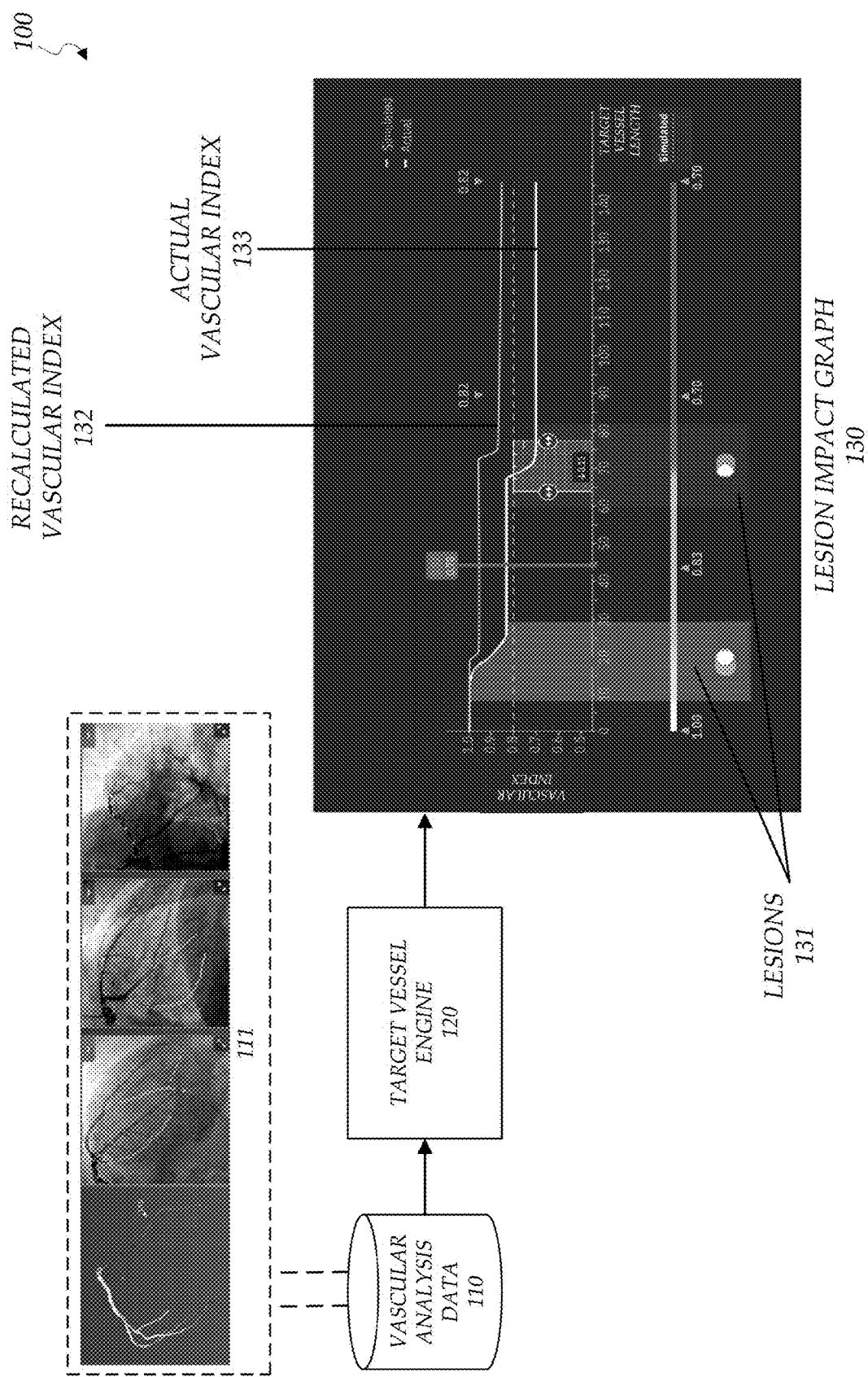
FIG. 1 is a block diagram of an example lesion impact system generating an adjustable lesion graph of a targeted vessel.

This specification describes techniques to more accurately, and non-invasively, characterize a patient's cardiac health options. As will be described, cardiac images (e.g., angiographic images) of a patient may be obtained. A system or user device may analyze the images to determine a set of lesions that may be negatively impacting the patient's health. A lesion, as may be appreciated, may be associated with a narrowing or constriction of a cardiac vessel. As known by those skilled in the art, due to safety, it may be impractical to revascularize all lesions of the determined vessel (e.g., via percutaneous coronary intervention). The disclosed technology enables medical professionals to simulate the effects of nulling particular lesions of a vessel and determine which lesion or lesions have the highest potential impact on vessel stenosis. Nulling a lesion, as will be described, may simulate removal of the lesion or causing the cardiac vessel in a location of the lesion to be adjusted in size. For example, diameters of the location may be adjusted to be normal (e.g., healthy) or similar to other locations of the vessel which are not associated with stenosis.

For example, and as described herein, an adjustable lesion graph (e.g., graph 130) may be generated which allows the medical professional to null the effects of lesions with respect to a score or index of cardiac health (collectively referred to herein as an index or index indicative of vascular function). An example index may include a fractional flow reserve value (FFR value). In this example, the adjustable lesion graph may depict 2, 3, 4, 5, and so on, lesions. Each of these lesions may be associated with a reduction in the index indicative of vascular function (referred to herein as an index drop).

A medical professional can null some, or all, of the lesions via user interface elements (e.g., toggles) included in a user interface. In some embodiments, the graph may include all lesions as causing index drops and the medical professional may null a subset of the lesions. When a lesion is nulled, the user interface may then update to include an updated score or index. As an example, the medical professional may null a particular lesion, such that its effects are eliminated, by interacting with a toggle included in the user interface. For this example, the index may update in substantially real-time. As an example, the graph may update such that the indices included in the graph (e.g., the index drops) are adjusted based on nulling the particular lesion. As described herein, toggling a lesion on, or toggling on a lesion, may indicate interaction with a user interface element which causes, in some embodiments, nulling of the lesion. Similarly, a lesion which has been toggled on is referred to herein as a nulled lesion.

Nulling a single lesion may represent the narrowing or constricting of a vessel being eliminated or substantially reduced. For example, nulling may represent the vessel's diameter being increased such that blood flow is not impeded (e.g., not impeded, not impeded more than normal, and so on). In this way, the nulled single lesion will not have an index drop or will not have an index drop greater than a threshold. Thus, when nulling a single lesion, a system or user device may determine an updated index indicative of vascular function based on a simulation of the lesion area as a healthy vessel.

However, nulling the single lesion may impact the index determination in complex ways which, at present, software-based techniques do not accurately capture. For example, the single lesion may have one or more lesions upstream and/or one or more lesions downstream. In this example, crosstalk effects between the lesions may cause non-linear adjustments to the index. Thus, simply simulating an index drop associated with the single lesion from an overall index may be inaccurate. The disclosed technology therefore ensures that such crosstalk effects are considered such that the overall index is accurately determined.

Additional disclosure related to determining an index indicative of vascular function and adjusting the index based on nulling lesions, and so on, are described in more detail in U.S. Pat. Nos. 10,595,807, 11,138,733, and 9,814,433 which are hereby incorporated herein by reference in their entireties.

The adjustable lesion graph described herein, for example, with respect to FIGS. 2A-2D, may therefore succinctly allow for the medical professional to analyze a patient's cardiac health options. For example, prior software-based tools may incorrectly indicate that nulling a particular lesion will be associated with a greatest index gain. In this example, the tools may identify the particular lesion having the greatest index gain. However, due to crosstalk effects it may be more advantageous to simulate a healthy vessel area at a different lesion, or a set of lesions.

This application therefore improves upon prior software-based analysis techniques. Additionally, the adjustable lesion graph provides for a holistic view into a patient's current health while flexibly detailing health options. In this way, the medical professional may more accurately determine which lesion of a set of lesions to simulate. The user interface cohesion simplifies such determinations and may additionally provide for a helpful aid to a patient in understanding his/her options.

In some embodiments, a system or user device may generate the adjustable lesion graph based on cardiac images of a patient's heart. For example, the cardiac images may represent angiographic images and may be obtained through minimally invasive procedures, such as a catheter inserted into the artery, or non-invasive procedures, such as a computer tomography (CT) scan. The cardiac images may be obtained, for example, from an imaging system (e.g., a c-arm) that captures the heart from different perspectives or viewpoints. The system or user device may then, in some embodiments, generate a three-dimensional model of the patient's heart or a portion thereof. The three-dimensional model may indicate diameters associated with vessels included in the patient's heart. In this way, the system or user device may identify lesions, compute an indices indicative of vascular function, and so on, based on the three-dimensional model. Additional description related to the above is included in U.S. Pat. No. 10,595,807, which is hereby incorporated herein by reference in its entirety.

In some embodiments, additionally or alternatively, the techniques described herein may be applied to vasculature of another organ, for example, a kidney, a retina, and/or a brain. It should be understood, where cardiac vasculature is described in particular, that implicit reference is also made to embodiments relating to the vasculature of another organ, with changes as necessary as would be clear to one skilled in the art.

Block Diagram—Lesion Impact System

FIG. 1 is a block diagram of an example lesion impact system 100 generating an adjustable lesion graph 130 of a targeted vessel. As described herein, the adjustable lesion graph 130 may include information identifying lesions along a vessel, or vessels, with the lesions' associated index drops. In some embodiments, the lesion impact system 100 can include lesions in the adjustable lesion graph 130 if the lesion is associated with an index drop greater than a threshold, for example, to illustrate the lesions with the highest impact. In some embodiments, the medical professional can determine what the index drop threshold is. In some embodiments, the index drop threshold can be minimal or such that any index drop is considered a lesion.

The lesion impact system 100 may represent a system of one or more processors, such as a computer, a tablet, a mobile device, a wearable device, and so on. The system 100 may execute an application which generates a coronary physiology assessment 111, which can include the adjustable lesion graph 130 described herein. The coronary physiology assessment 111, which can be referred to as a cardiac model, can include data that was derived from angiographic images, such as, but not limited to, a 3D cardiac model(s) (3D model), the geometry information of the vessel (such as vessel width and length), lesion locations based on the geometry information, 2D cardiac model(s), the index values or index drops at locations along one or more vessels, and so on. The system 100 may additionally present user interfaces which include information determined from an outside system (e.g., a cloud or server system). In some instances, the user interfaces can allow the user to adjust the data displayed in the coronary physiology assessment 111 and/or generate additional data related to the patient's coronary vasculature.

The lesion impact system 100 may determine the information which forms the adjustable lesion graph 130, which may be collectively referred to as a cardiac model, based on cardiac images, such as angiographic images. The angiographic images can be stored in a vascular analysis database 110. The system 100 may analyze the angiographic images to identify one or more target vessels in the target vessel engine 120. A three-dimensional model may then be created, and estimations of vessel diameter may be effectuated along the length of the vessels. These vessel diameters may be used, for example, to inform the identification of lesions along the vessels. Thus, the system 100 may determine, or access, information identifying positions of lesions and diameters across the length of the vessel.

The system 100 may additionally determine indices indicative of vascular function along the length of the vessels. As an example, the system 100 may determine index drops, such as reductions in fractional flow reserve (FFR) value, downstream in the vessel. Example index drops may be attributed to stenoses or lesions for which medical intervention may be advantageous. As illustrated, the graph 130 may map or plot the vascular index (e.g., FFR value) or index drops (e.g., from a starting or normalized value, such as 1) based on length along the vessel. For example, individual locations along the length of vessel may have individual vascular indices or index drops.

Additional disclosure related to determining a three-dimensional model, an index indicative of vascular function, and so on, are described in more detail in U.S. Pat. No. 10,595,807, which is hereby incorporated herein by reference in its entirety.

In the illustrated example, the adjustable lesion graph 130 depicts the left anterior descending (LAD) artery or vessel. Thus, the adjustable lesion graph 130 includes information related to narrowing of the LAD along its length. In FIG. 1, the length extends from 0 to a threshold length which may represent a unit of measurement associated with the length of the LAD. In the example, the graph 130 includes the length along a first axis (e.g., the x-axis).

Along a second axis, the adjustable lesion graph 130 includes values for an index indicative of vascular function (referred to in FIG. 1 as a vascular index). For example, the index may represent a fractional flow reserve (FFR) value which may have an upper limit of 1.0. As known by those skilled in the art, lesions may cause a reduction in FFR which is referred to herein as an index drop.

Thus, the adjustable lesion graph 130 maps index values to position along the length of the LAD. A line, referred to as the actual vascular index 133, represents a patient's index as it changes along the length of the LAD. As illustrated, there are two lesions 131 with one lesion being positioned between about 20 and 70 units along the first axis. The first lesion is associated with an index drop to above about 0.8 and second is associated with an index drop to about 0.7 with about a 0.15 index drop change. In some embodiments, an index value below 0.8 may be considered an abnormal value (e.g., index drops or pressure changes associated with the effects of CAD).

Toggles are positioned proximate to positions of the lesions 131 (e.g., user interface elements which allow for toggling). As mentioned above, a user may provide user input to the adjustable lesion graph 130 to toggle on or off a lesion. As described herein, the user may null a lesion by toggling the nulling effect of the lesion on. An update to the adjustable lesion graph 130 based on a user toggling a lesion on can include determining an "unstenosed," or non-stenotic, state of a blood vessel segment, and in particular, an estimate of the geometry of a blood vessel as if a region of stenosis were opened therein, modeling the effect on a healthy blood vessel segment.

Nulling the lesion therefore causes the effect of the lesion to be removed. For example, in some embodiments the system 100 may update the diameter associated with the lesion to be open (e.g., normal or that which is associated with an index drop less than a threshold). In this example, the system 100 can determine updated index values based on the updated diameter for the length of the vessel associated with the lesion (e.g., 20 and 70 units as an example).

Determining index values is described in more detail with respect to at least U.S. Pat. No. 10,595,807. Since the index values are determined using the diameters or radii of the lesions, and updated or nulled lesions, the effects of crosstalk between lesions can be addressed. In some instances, the diameters of the lesions can be determined from the 3D vascular tree model.

The lesion impact system 100 can indicate to a user the vascular index 133 and the lesions 131 along the target vessel and allow user input to null out a selected lesion to generate an at least partially healthier vascular system than the originally generated coronary physiology assessment 111. The adjustable lesion graph 130 can update to indicate to the user the simulated vascular index 132 along the length of the target vessel without the effect of selected nulled lesions. In some instances, to null out a selected lesion can be by increasing the diameter of the lesioned area to a diameter considered normal and/or healthy. A normal and/or healthy diameter can be when there is no drop in the index values at the lesioned area.

In some embodiments, a nulled lesion can be directly implemented into a 3D vascular tree model generated in the coronary physiology assessment 111 for assessment. For example, the nulled lesion can include modifications of vascular width beyond the length of the area of the lesion, reflecting, for example, the elasticity of the vascular wall. In some embodiments, the nulled lesion is simulated in 2-D by forming a deformation in a vascular wall's 2-D image that simulates a healthy vessel diameter, then re-importing the modified image into the model. This method can preserve information about the implantation site's curvature and surrounding environment. Furthermore, updating 2-D images taken from more than one angle can result in a complete assessment of the implant environment. Moreover, adjustable lesion graph 130 can apply more than one nulled lesion to determine the impact of nulling more than one lesion.

In some embodiments, lesion nulling can include identifying portions of the vasculature relatively unaffected by disease. In such embodiments, the disease can be, for example, stenotic (narrow) regions of the vasculature, or in others, for example, can be aneurysm (widened) regions of the vasculature. Construction of the healthy vasculature, in some embodiments, can estimate a healthy vascular lumen size based on the healthiest vascular regions nearby which can be identified. Additionally or alternatively, identification of a healthy region comprises the substitution of a homologous vessel—for example, a vessel from another portion of the same vascular tree or a portion of another vascular tree that is matched to the modeled vascular tree in terms of one or more parameters such as age, gender, and/or body size.

In some embodiments, healthy vasculature simulation can include using later- and/or earlier-obtained images of a vascular tree. In some embodiments, the earlier images are used, in whole or in part, as a non-stenotic baseline or as a basis for determining a non-stenotic state. In such embodiments, the non-stenotic vascular state is extrapolated, based, for example, on the determination that certain regions can be observed to close over time, reflecting their stenotic character.

In other embodiments, healthy vasculature simulation comprises the propagation of a healthy vessel region width estimation into a region of width change due to disease. The propagation comprises, for example, extrapolation between non-diseased vascular regions across regions that are or may be diseased.

In some embodiments, propagation comprises weighting the presumptively most healthy areas to be more important in setting a vascular width than other regions. Healthy vascular regions may be, for example, relatively wide regions and/or those nearest to a simulated value based on location in the vasculature and/or other parameters such as patient vital statistics.

Example Adjustable Lesion Graphs

FIGS. 2A-D illustrates example user interfaces which include an example adjustable lesion graph 130 with different nulling effects of lesions toggled on, or off, by a user. The user interfaces may be examples of user interfaces rendered by an application executing on a system or user device. The user interfaces may also represent front-end user interfaces associated with a web application.

FIGS. 2A-D illustrates the same example adjustable lesion graph 200A-D of a targeted vessel with different combinations of nulled lesions toggled on. The example adjustable lesion graphs 200A-D of the targeted vessel illustrates three different lesions along the length of the target vessel whose nulling can be toggled on to update the vascular index.

Figure 2A:
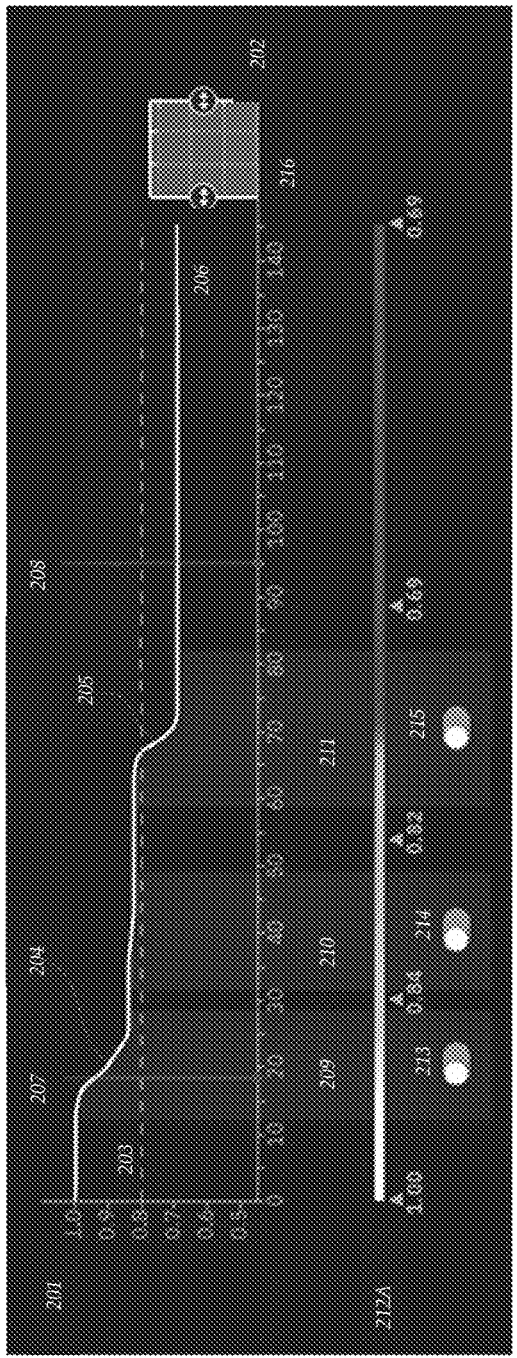
FIG. 2A illustrates an example adjustable lesion graph with three lesions.

FIG. 2A illustrates an example information of an adjustable lesion graph 200A with three lesions along the length of the target vessel and no lesion nulling toggled on to update the vascular index analysis of the target vessel. The adjustable lesion graph 200A depicts an actual vascular index graph 206 of the vascular index 201, such as FFR, along the target vessel length 202. The target vessel length 202 can be a measurement along the target vessel selected. In some embodiments, the target vessel length 202 can be in millimeters.

As depicted in the adjustable lesion graph 200A, at approximately 68 mm, the actual vascular index graph 206 crosses the vascular index stenosis threshold 203, set at 0.8. As disclosed above, an FFR value below 0.8 can indicate the potential presence of stenosis. Therefore, as indicated by the actual vascular index graph 206 being under the vascular index stenosis threshold 203 from approximately 68 mm to 140 mm, this portion of the vessel is determined to have potential to indicate the presence of stenosis in the overall vessel due to the lesions' physiological impacts. As indicated in the adjustable lesion graph 200A, there are three lesions along the target vessel length 202, a first lesion 209 at approximately 15-29 mm, a second lesion 210 at approximately 31-49 mm, and a third lesion 211 at approximately 59-82 mm.

The lesion impact system 100 can determine these lesions by determining a vascular state score for each, such as a SYNTAX value, and comparing it to a lesion threshold. Additional description related to the above is included in U.S. Pat. No. 10,943,233, which is hereby incorporated herein by reference in its entirety. In some embodiments, for vessel narrowing that does not meet the index drop threshold to be considered a lesion, the adjustable lesion graph 200A includes a user-selected lesion 216. The user-selected lesion 216 can provide a user with an option to indicate a portion of the vessel, which did not meet an index drop threshold, to be analyzed or to implement a nulled lesion. In some instances, the user-selected lesion 216 can be represented by an adjustable box that can be re-positioned by the user along the length of the vessel. Similar to the lesion impact system 100 determining a boundary for each of the lesions meeting the index drop threshold, the user can adjust the size of the user-selected lesion 216 box to increase or decrease the boundary of the user-selected lesion. For further insight, a first lesion actual impact 204 can be shown to result in a 0.16 point drop as a result of the first lesion 209, and a third lesion actual impact 205 can be shown to result in a 0.13 point drop as a result of the third lesion 211.

Although the adjustable lesion graph 200A does not implement them, the adjustable lesion graph 200A depicts a first lesion toggle 213, a second lesion 214, and a third lesion toggle 215 that can implement a nulled lesion for a lesion toggled on. In some instances, the analysis or nulling of the user-selected lesion 216 can be automatic in response to the user-selected lesion 216 box being dragged over a portion of the vessel length or in response to a user indication. In some instances, the user indication for the user-selected lesion 216 can be implemented as a toggle similar to the other lesion toggles 213, 214, 215.

An adjustable lesion graph 200A can also include a vascular index color graph 212A that depicts the vascular index along the target vessel length 202. As illustrated, the graph includes a starting index value of 1 and an ending of 0.69. In some embodiments, as lesions are nulled the ending index value may be updated in real time (e.g., as described in block 308 of FIG. 3, this ending index value may be presented as a single index value for presentation to the user). In some embodiments, the vascular index color graph 212 can be color coated so that different vascular index values correspond to different colors. For example, a vascular index value of 1.00 can be represented by white, and a vascular index color of 0.50 or less can be represented by black.

In some embodiments, the values between 1.00 and 0.50 can gradually shift between colors. For example, the values of 1.00 to 0.9 can gradually shift from white to yellow, the values of 0.9 to 0.75 can gradually shift from yellow to orange, the values of 0.75 to 0.65 can gradually shift from orange to red, and the values of 0.65 to 0.5 can gradually shift from red to black. In alternative embodiments, the values between 1.00 and 0.50 can be a grayscale shifting from white and darkening until it reaches black. The colors presented are not intended to be limiting, as the system can use any color for any vascular index value and does not require a gradual shift.

In some embodiments, the vascular index color graph 212A can depict numerical representations of the vascular index 201 along the target vessel length 202. In some embodiments, the location of the vascular index color graph 212 can mirror the x-axis's target vessel length 202 so that the vascular index illustrated on the vascular index color graph 212 corresponds to the position along the target vessel length 202. In some embodiments, the numerical representations can be at points of interest, including the beginning and end of the target vessel and any points near a lesion. Additionally, the adjustable lesion graph 200A can include a user-selected actual vascular index 208 to select a point along the target vessel length 202 to indicate the vascular index 201 at said point. Similar to the vascular index color graph 212A, the actual vascular index 208 markers can correspond to the color associated with the vascular index 201 at the marked point.

In some embodiments, the first lesion actual impact 204, the second lesion actual impact, third lesion actual impact 205, and similar impact scores may not be depicted. In some embodiments, a maximal 3D stenosis diameter 207 regarding the target vessel diameter drop can be depicted. The maximal 3D stenosis diameter 207 can be the region of the actual vascular index graph 206 with the highest gradient. This highest gradient can correspond to the area along the target vessel with the drop in the index value.

Figure 2B:
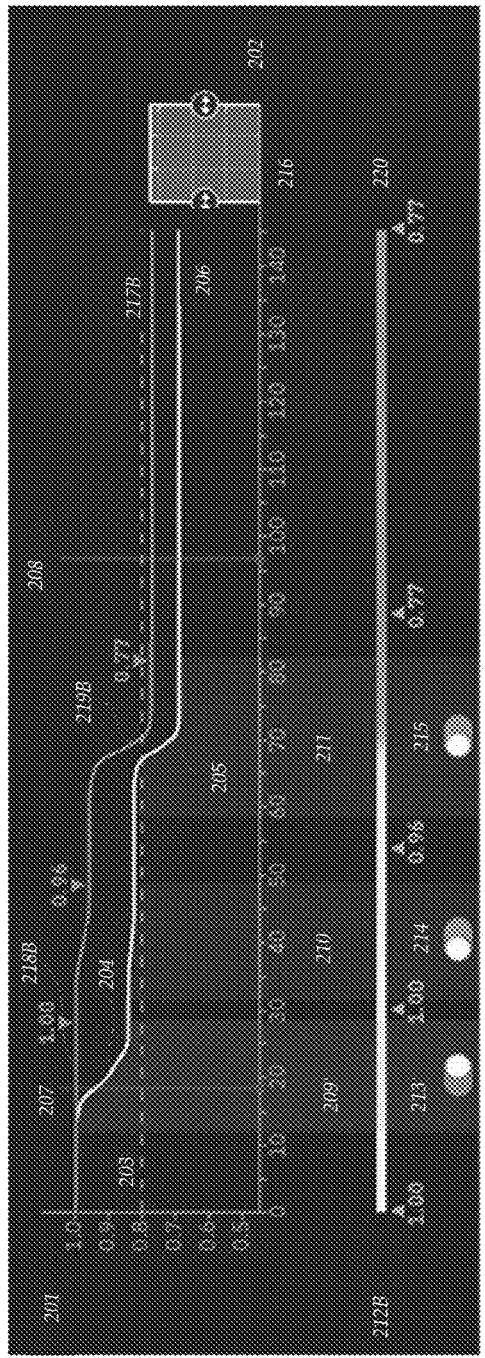
FIG. 2B illustrates the example adjustable lesion graph with a first lesion toggled to null the lesion.

FIG. 2B illustrates example information of an adjustable lesion graph 200B with three lesions along the length of the target vessel with a first lesion toggled on 213' to update the vascular index analysis of the target vessel to show the impact of the nulled first lesion 209'.

The adjustable lesion graph 200B in FIG. 2B is the same as the adjustable lesion graph 200A in FIG. 2A, except as noted. The adjustable lesion graph 200B depicts a first lesion toggled on 213' that implements a nulled first lesion 209'. This results in a simulated vascular index graph 217B of the vascular index 201 along the target vessel length 202, without the effect of the first lesion. The simulated vascular index graph 217B can be compared to the actual vascular index graph 206 to visualize changes in index drops at areas of the lesion, such as a first lesion simulated impact 218B compared to the first lesion actual impact 204 and a third lesion simulated impact 219B compared to the third lesion actual impact 205. Even if a particular lesion is not nulled, the simulated index drop can differ from the actual index drop as a result of cross-talk effects from the nulled lesions. As depicted by the simulated vascular index graph 217B, a nulled lesion at the first lesion provides a higher FFR value in the first half of the target vessel but still results in the potential presence of stenosis with the remaining lesions.

The value beyond 70 mm is below the vascular index stenosis threshold 203. The shift in drop can be illustrated by a first lesion simulated impact 218B compared to first lesion actual impact 204, which depicts a huge increase. However, the drop at the third lesion is still significant, as depicted by the simulated vascular index graph 217B at a third lesion simulated impact 219B dropping relatively equivalent to the third lesion actual impact 205.

In some instances, the portion of the vessel length covered by the user-selected lesion 216 can be associated with a sectional change of the index along the portion of the vessel length for the actual vascular index graph 206 and the simulated vascular index graph 217B. The sectional change can be a difference, change, or measure of central tendency, of a value determined by the user along the portion of the vessel that the user dragged the user-selected lesion over, from the beginning of the user-selected lesion 216 box to the end of the user-selected lesion 216 box. The value determined by the user can be a change of index, a change of vessel diameter, or other values represented in the coronary physiology assessment 111. For example, if the user-selected lesion 216 was dragged to cover the portion of the vessel from 10 units to 30 units, not shown, then a sectional change of the index for the actual vascular index graph 206 can be displayed as 0.18 to represent the drop of the index from about 1.0 at 10 units to just above 0.8 at 30 units, along with a section change of the index for the simulated vascular index graph 217B displayed as 0.00 to represent the lack of drop of the index from about 1.0 at 10 units maintained as 1.0 at 30 units.

Figure 5:
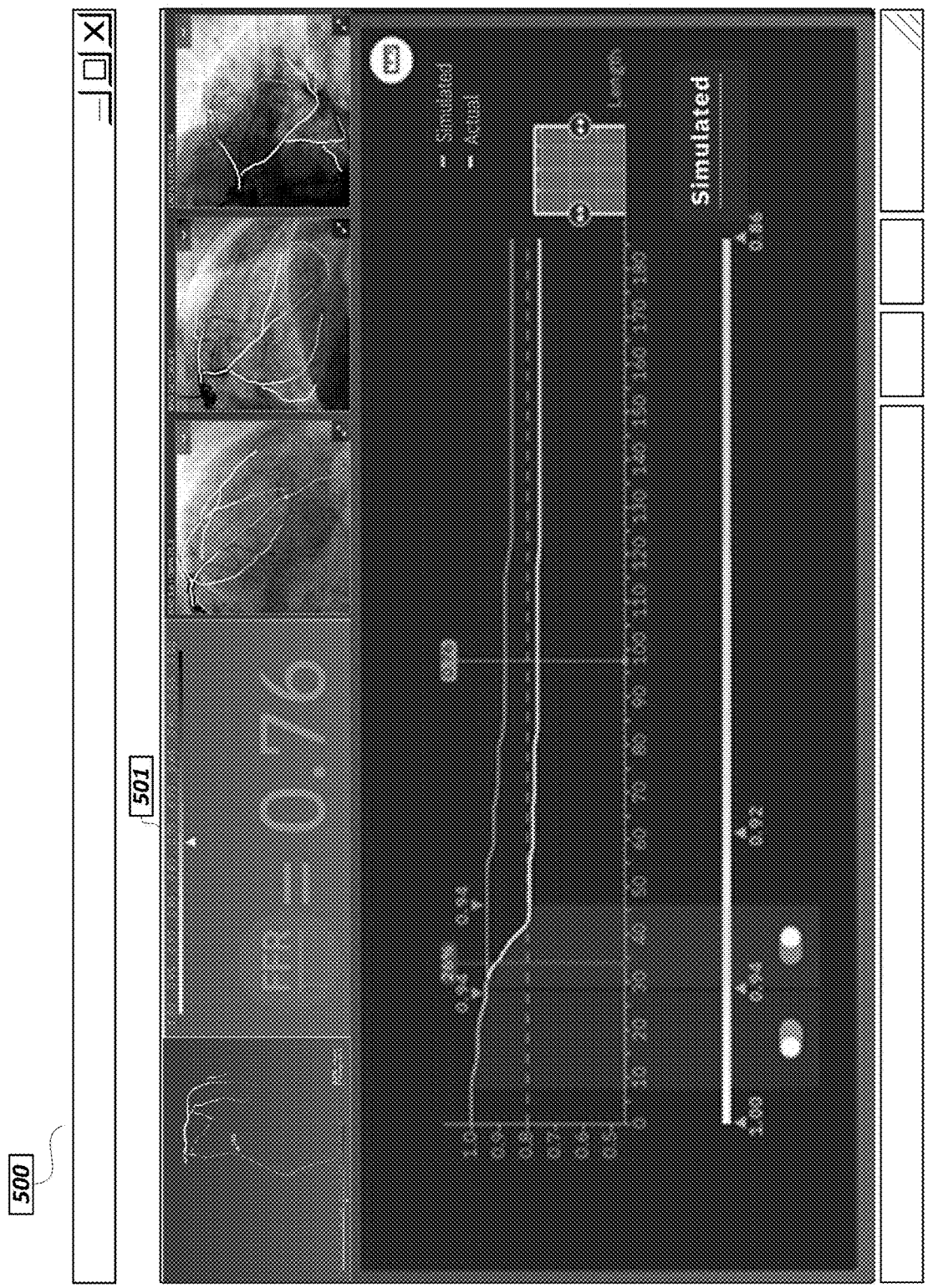
FIG. 5 is a user interface illustrating another example of a vascular assessment that includes an adjustable lesion graph.
Figure 6:
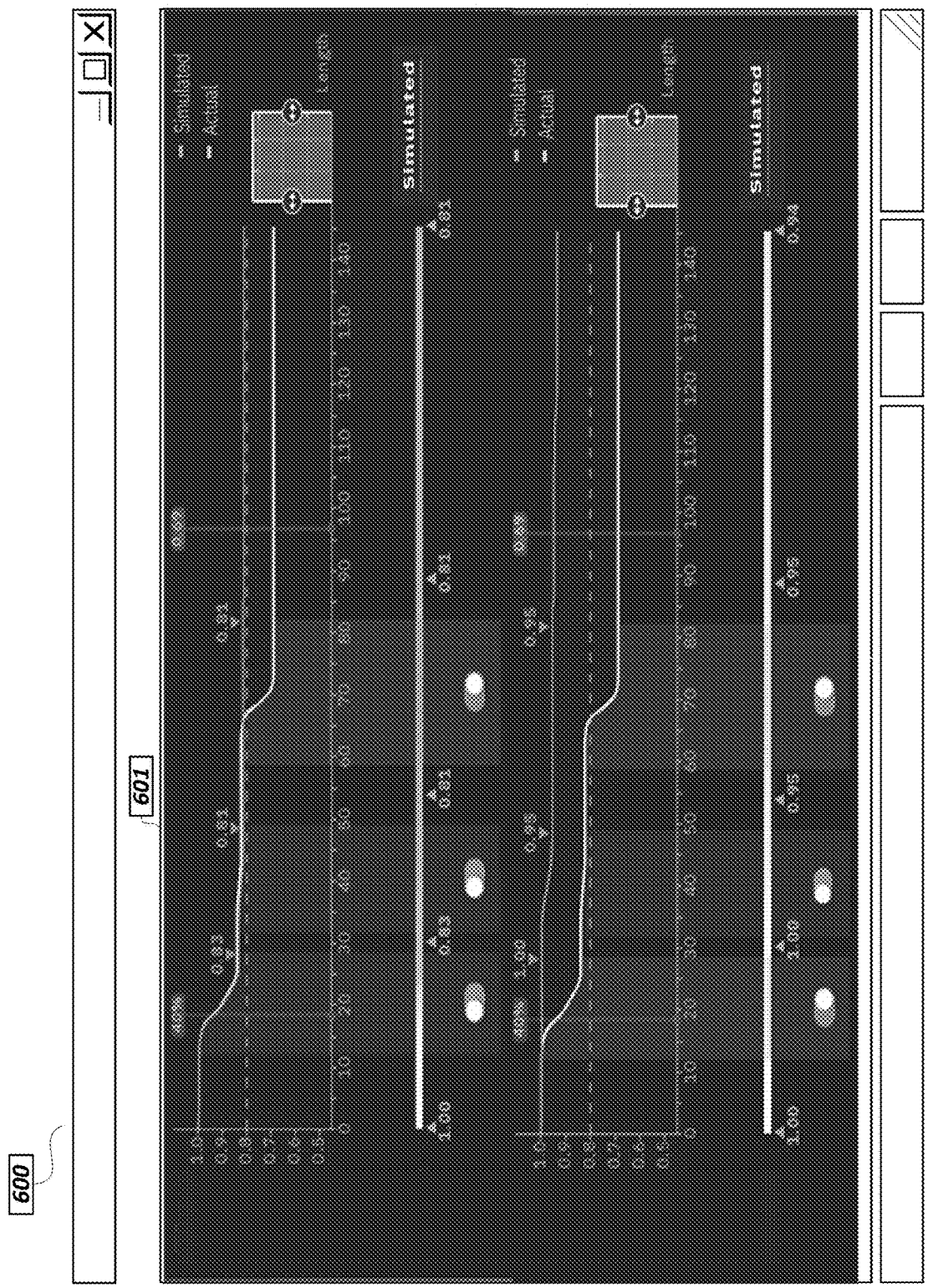
FIG. 6 is a user interface illustrating a comparison between the two example adjustable lesion graphs.

The 200B also includes an updated vascular index color graph 212B corresponding to the simulated vascular index graph 217B. Additionally, when a lesion nulling is toggled, the lesion impact system 100 may denote that the vascular index color graph 212 has "updated values" as shown in FIGS. 5-6.

Figure 2C:
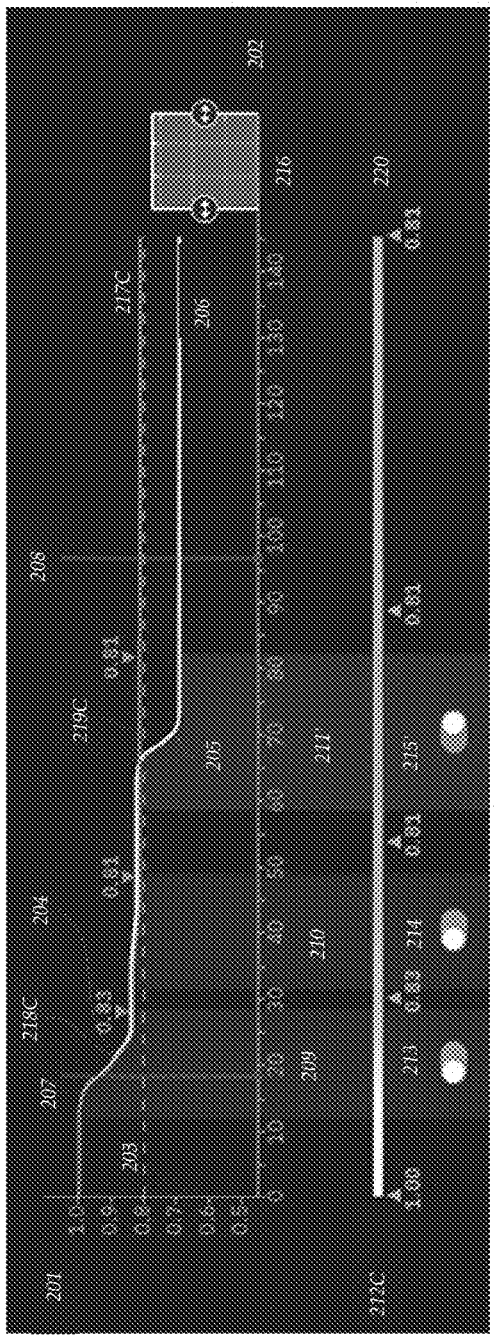
FIG. 2C illustrates the example adjustable lesion graph with a third lesion toggled to null the lesion.

FIG. 2C illustrates example information of an adjustable lesion graph 200C with three lesions along the length of the target vessel with a third lesion toggled on 215' to update the vascular index analysis of the target vessel to show the impact of the nulled third lesion 211'. The adjustable lesion graph 200C in FIG. 2C is similar to the adjustable lesion graph 200B in FIG. 2B but is analyzed using a nulled lesion on the third lesion 211 instead of the first lesion 209. As such, the values of the simulated vascular index graph 217C, first lesion simulated impact 218C, and updated vascular index color graph 212C are adjusted accordingly. As indicated by the simulated vascular index graph 217C, the nulled third lesion 211' indicates a low potential presence of stenosis, as the simulated vascular index graph 217C remains above 0.8 throughout target vessel length 202. Thus, even though the first lesion 209 caused a 0.3 larger drop in FFR than the third lesion 211, a nulled third lesion 211' can be more effective than a nulled first lesion 209' at indicating a lack of potential presence for stenosis.

Figure 2D:
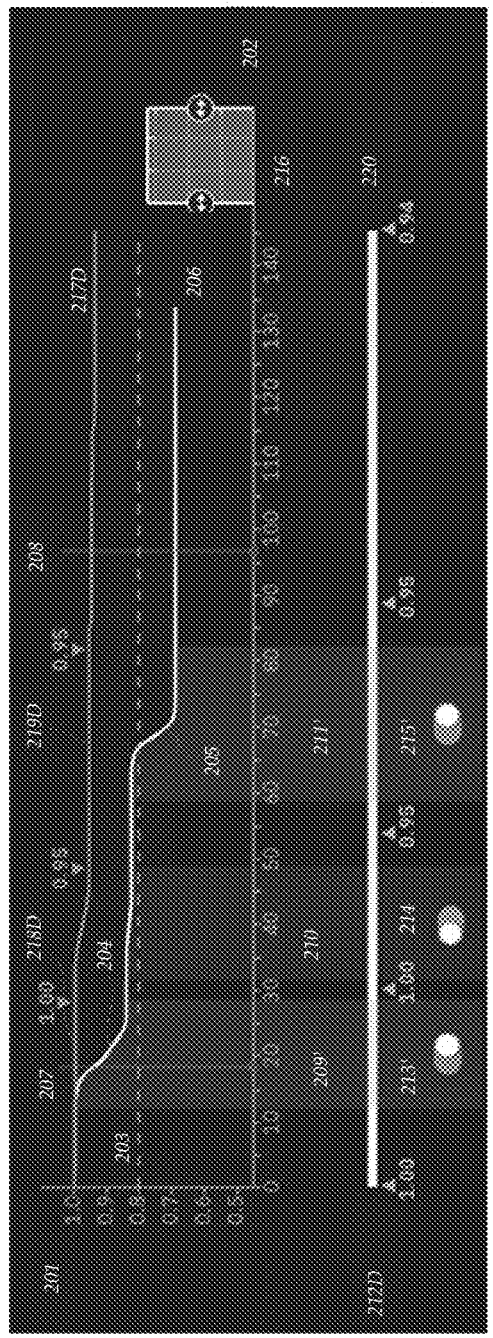
FIG. 2D illustrates the example adjustable lesion graph with the first and the third lesions toggled to null the lesions.

FIG. 2D illustrates example information of an adjustable lesion graph 200D with three lesions along the length of the target vessel and the first lesion toggled on 213' and the third lesion toggled on 215' to update the vascular index analysis of the target vessel to show the impact of the nulled first lesion 209' and the nulled third lesion 211'. The adjustable lesion graph 200D in FIG. 2D is similar to the adjustable lesion graph 200B-C in FIG. 2B-C but is analyzed using a nulled lesion on both the first lesion 209 and third lesion 211, rather than a single respective lesion. As such, the values of the simulated vascular index graph 217D, first lesion simulated impact 218D, first lesion simulated impact 218D, and updated vascular index color graph 212D are adjusted accordingly. As illustrated in the adjustable lesion graph 200D, the simulated vascular index graph 217D maintains a high FFR due to the nulled first lesion 209' and nulled third lesion 211'.

Example Flowchart

Figure 3:
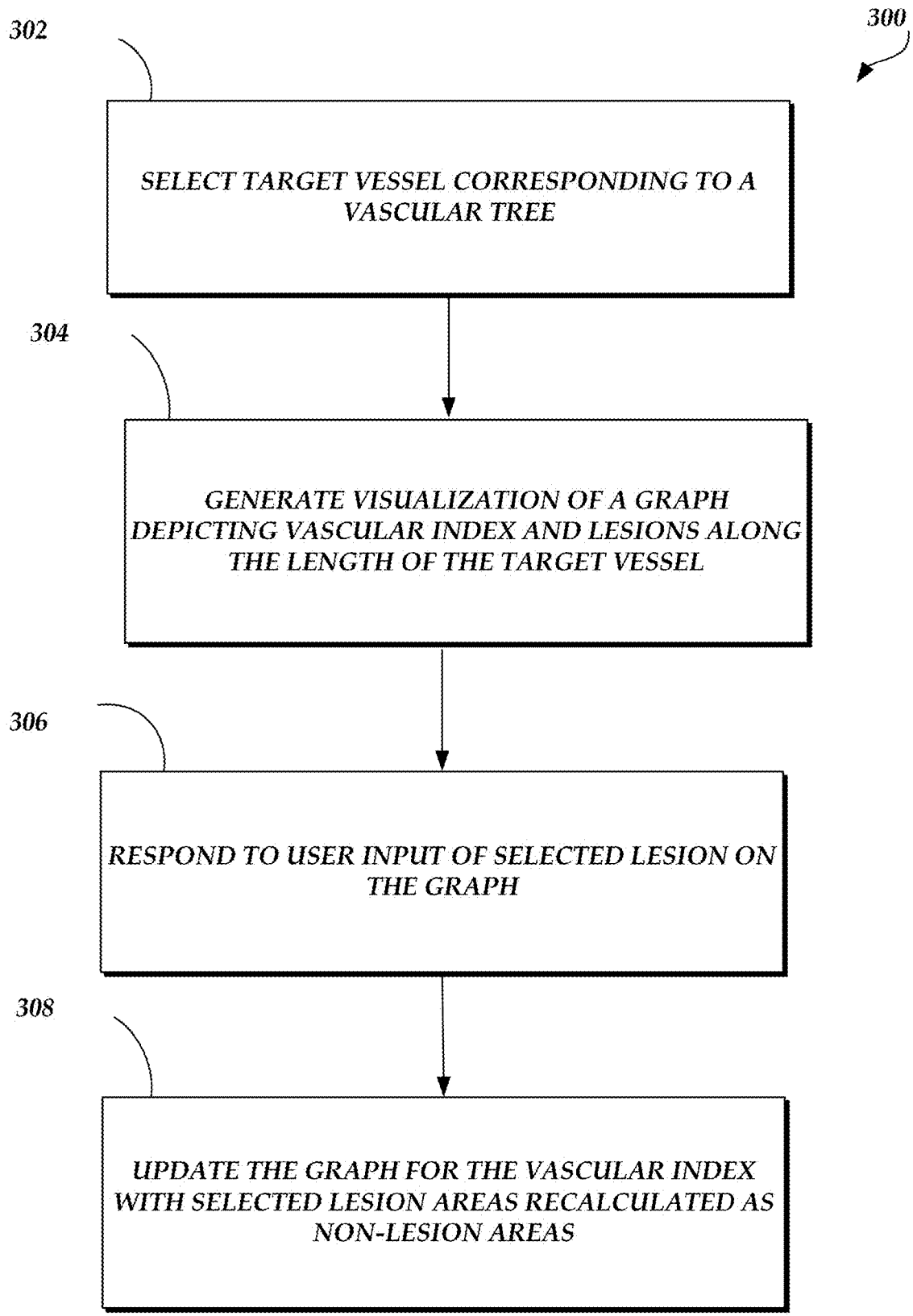
FIG. 3 is a flowchart of an example process for generating a user interface which is responsive to user input associated with toggling lesions included in an adjustable lesion graph.

FIG. 3 is a flowchart of an example process for generating an adjustable lesion graph 130, 200A-D that can be updated to provide information on a lesion's impact on the vascular index of a target vessel. For convenience, process 300 will be described as being performed by a system of one or more computers (e.g., the lesion impact system 100).

At block 302, the system selects a target vessel corresponding to a vascular tree. The vascular tree can be part of the cardiac model, which can include either a 3D model of the cardiac vasculature or a 2D angiographic image. As described above, the vascular tree can be obtained from vascular analysis data store 110 storing a cardiac model, such as from a previously completed coronary physiology assessment 111 or one obtained in real-time during a catheterization procedure.

Figure 4:
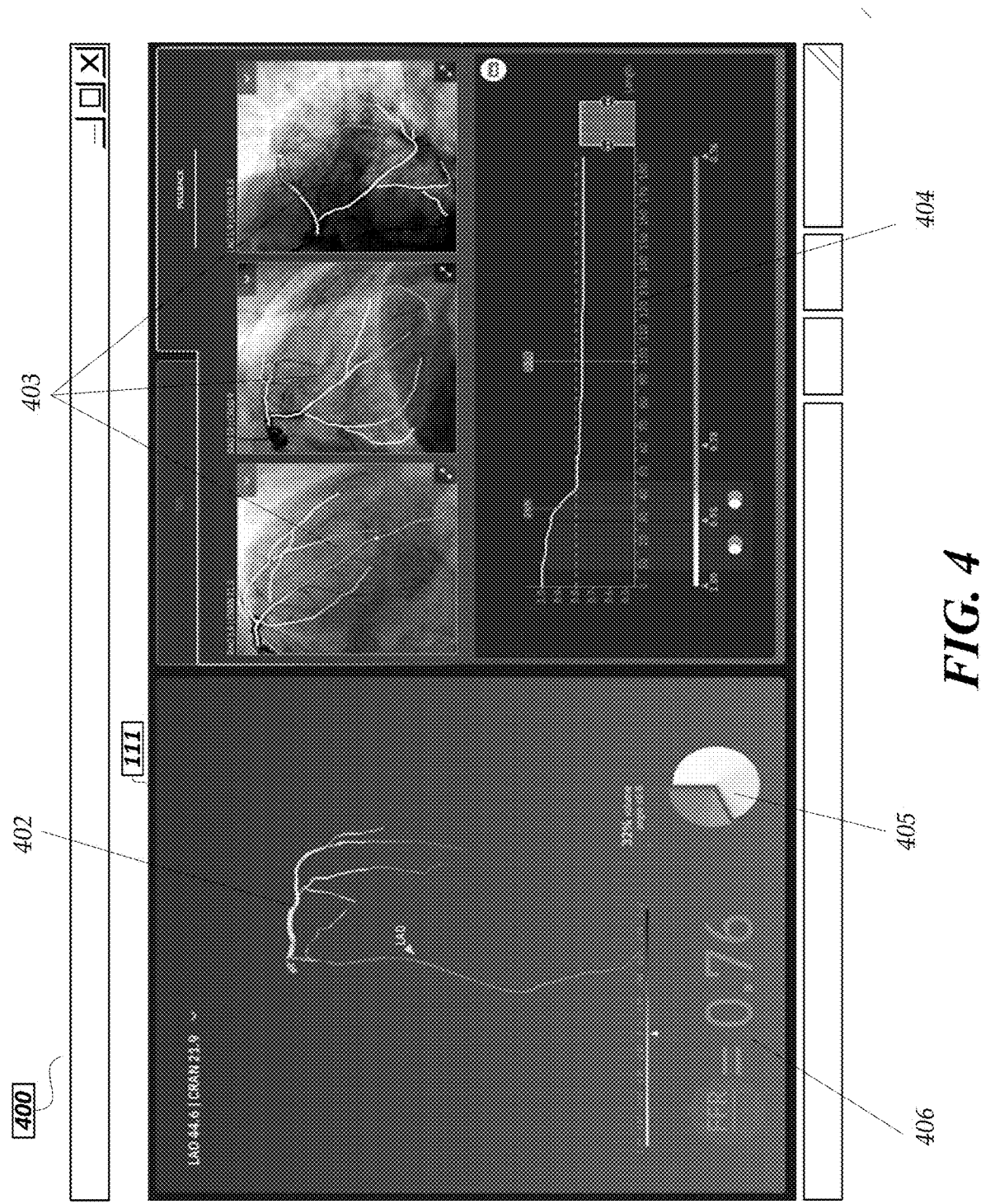
FIG. 4 is a user interface illustrating a vascular assessment that includes an adjustable lesion graph.

At block 304, the system generates a visualization of a graph depicting the vascular index and lesions along the length of the target vessel. The system can already have the graph generated in the vascular analysis data store 110 as part of the coronary physiology assessment 111, as show in FIG. 4 depicting an adjustable lesion graph 404. As described above, determining a lesion can relate to a vascular state scoring, such as a SYNTAX score.

At block 306, the system responds to the user input of selected lesions on the graph. As described above, a user may toggle a button corresponding to a particular lesion to analyze the vessel by nulling the lesion. In some embodiments, a user can select portions of the vessel that are identified as lesions. The system can then null the selected lesions and reanalyze the vascular index along the target vessel.

At block 308, the system updates the graph for the vascular index with the selected lesion areas recalculated as non-lesion areas. As described above, the system may overlay a simulated vascular index graph 217B-D over an actual vascular index 208, as well as other alterations described above, to indicate a physician about the simulated results of implementing a stent for a particular lesion. In some embodiments, the system may present an index value which represents a final index value at a threshold distance from a distal end of the target vessel (e.g., which includes the lesions). For example, it may be similar or the same value as the ending index value in element 212A. As an example, when nulling the lesion the index value after the lesions may be increased due to the removal of the effects of the lesion. Thus in some embodiments this single index value may be presented such that the user can cycle through toggling on/off lesions and view the corresponding index value.

User Interface

FIGS. 4-6 illustrate example user interfaces identifying aspects of the features described herein. These user interfaces may be rendered partially by a computer system implanting the lesion impact system 100 or its alternative embodiments.

FIG. 4 is a user interface 400 illustrating a vascular assessment 401. As illustrated, the vascular assessment 401 can include an actual vascular index 406 at a target lesion, an adjustable lesion graph 404, a vascular index pie chart 405 depicting the overall health of the target vessel by illustrating what volume of the target vessel has an index below a threshold value and a visual indicator on how the index values are distributed on the target vessel, a 3D model 402 of the cardiac vasculature, and the 2D angiographic images 403 with a color coating. The adjustable lesion graph 404 illustrated in FIG. 4 is similar to the adjustable lesion graph 200A in FIG. 2A can include information similar to 200A but only depicts two lesions instead of three. The vascular index along the length of the target vessel has a subtle drop at the first lesion and a more significant drop at the second lesion, as illustrated, which may indicate ischemia.

FIG. 5 is a user interface 500 illustrating an alternative embodiment of a coronary physiology assessment 111 with an exploded view of the adjustable lesion graph. The adjustable lesion graph illustrated in FIG. 5 depicts the same target vessel as the adjustable lesion graph 404 in FIG. 4, but with the second lesion nulling toggled on. As illustrated, the adjustable lesion graph is similar to the adjustable lesion graphs 200B-C in FIGS. 2B-D, as they can include the simulated vascular index graph generated by toggling the second lesion on and the updated color graph indicator. As illustrated, nulling out the second lesion can provide an estimate on the impact of said lesion on the potential presence of CAD. In some embodiments, the adjustable lesion graph may not display a simulated lesion simulated impact, as illustrated.

FIG. 6 is a user interface 600 illustrating a comparison between the adjustable lesion graph 200C in FIG. 2C and the adjustable lesion graph 200D in FIG. 2D to provide a user with a visualization of the impact of the first lesion on the atherosclerosis if the third lesion is assumed to be healthy. As described above, although nulling out just the third lesion still illustrates the potential presence of CAD, nulling out both the first and third lesions can illustrate meaningly impact on the potential presence of CAD.

Other Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the term "about" refers to within +10%.

The terms "comprises", "comprising", "includes", "including", "having", "such as" and their conjugates mean: "including but not limited to".

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical, and medical arts.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by a system of one or more processors, the method comprising:
   accessing a cardiac model of a portion of a patient's heart, the portion including one or more vessels of the patient's heart, and the cardiac model indicating a plurality of lesions along a length of at least one of the vessels;
   obtaining, based on the cardiac model for the lesions, respective positions along the length for which the lesions are associated with index drops, wherein the index drops are with respect to an index indicative of vascular function; and
   causing presentation of a user interface, wherein the user interface:
      presents a graph mapping individual positions along the length of the at least one of the vessels on a first axis and values of the index indicative of vascular function on a second axis,
      presents individual user interface elements enabling nulling of individual lesions, and
      updates the graph in response to received user input to one or more of the user interface elements, wherein the user input nulls effects of one or more lesions, wherein the user input triggers the update, by the system, based on the cardiac model and the update is configured to address crosstalk effects associated with remaining lesions;
      wherein nulling a lesion causes updating diameters at the positions along the length which are associated with the nulled lesion, and wherein the updated diameters cause the index drop associated with the nulled lesion to be reduced.

2. The method of claim 1, wherein the user interface elements are toggles proximate to respective positions associated with the index drops on the graph.

3. The method of claim 1, wherein the plurality of lesions comprises at least one user-identified lesion.

4. The method of claim 1, wherein the plurality of lesions further comprises at least one automatically-identified lesion that meets an index drop threshold.

5. The method of claim 1, wherein the cardiac model includes a three-dimensional model generated based on angiographic images.

6. The method of claim 1, wherein the values of the index indicative of vascular function are fractional flow reserve values.

7. The method of claim 1, wherein the graph is a line.

8. The method of claim 1, wherein the updated diameters cause the index drops associated with lesion to be reduced less than a threshold.

9. The method of claim 1, wherein the user interface updates the graph to include a mapping of updated index indicative of vascular function associated with nulling the effects of the one or more lesions.

10. The method of claim 9, wherein the update to the graph indicates whether the at least one of the vessel is healthy based on values of the updated index indicative of vascular function being above a threshold index.

11. The method of claim 10, wherein the graph presented by the user interface comprises a mapping of the threshold index along the length of the at least one of the vessels, and wherein the graph indicates the at least one of the vessels is healthy when the mapping of the updated index indicative of vascular function is above the mapping of the threshold index across the first axis.

12. The method of claim 1, wherein the index drops are with respect to reductions in fractional flow reserve value, and wherein updating the index indicative of vascular function includes updating the index drops along the length of the at least one of the vessels.

13. The method of claim 1, wherein the updating of the index indicative of vascular function includes identifying a change in a distal value of the index indicative of vascular function at a threshold distance from a distal end of the at least one vessel.

14. The method of claim 1, wherein the user interface presents the graph mapping individual positions along the length of the vessel and the values of the index indicative of vascular function prior to the update simultaneously with the update to the graph.

15. The method of claim 1, further comprising:
   determining the values of the index indicative of vascular function along the length based on diameters of the at least one of the vessels that are determined from the cardiac model; and
   in response to receiving the user input, determining updated values of the index indicative of vascular function along the length based on the diameters determined from the cardiac model and the user input, the user input nulling the effects of the one or more lesions by adjusting diameters of the positions associated with the one or more lesions to be above a threshold diameter.

16. The method of claim 1, wherein the user interface further presents a three-dimensional representation of the cardiac model simultaneously with the graph.

17. Non-transitory computer storage media storing instructions that when executed by a system of one or more computers, cause the one or more computers to:
   access a cardiac model of a portion of a patient's heart, the portion including one or more vessels of the patient's heart, and the cardiac model indicating a plurality of lesions along a length of at least one of the vessels;
   obtain, based on the cardiac model for the lesions, respective positions along the length for which the lesions are associated with index drops, wherein the index drops are with respect to an index indicative of vascular function; and cause presentation of a user interface, wherein the user interface:
  presents a graph mapping individual positions along the length of the at least one of the vessels on a first axis and values of the index indicative of vascular function on a second axis,
  presents individual user interface elements enabling nulling of individual lesions, and
  updates the graph in response to received user input to one or more of the user interface elements, wherein the user input nulls effects of one or more lesions, wherein the user input triggers the update, by the system, based on the cardiac model and the update is configured to address crosstalk effects associated with remaining lesions;
  wherein nulling a lesion causes updating diameters at the positions along the length which are associated with the nulled lesion, and wherein the updated diameters cause the index drop associated with the nulled lesion to be reduced.

18. The computer storage media of claim 17, wherein the index drops are with respect to reductions in fractional flow reserve value, and wherein updating the graph includes updating the index drops along the length of the at least one of the vessels.

19. A system comprising one or more processors and non-transitory computer storage media storing instructions that when executed by the one or more processors, cause the one or more processors to:

access a cardiac model of a portion of a patient's heart, the portion including one or more vessels of the patient's heart, and the cardiac model indicating a plurality of lesions along a length of at least one of the vessels;

obtain, based on the cardiac model for the lesions, respective positions along the length for which the lesions are associated with index drops, wherein the index drops are with respect to an index indicative of vascular function; and cause presentation of a user interface, wherein the user interface:
  presents a graph mapping individual positions along the length of the at least one of the vessels on a first axis and values of the index indicative of vascular function on a second axis,
  presents individual user interface elements enabling nulling of individual lesions, and
  updates the graph in response to received user input to one or more of the user interface elements, wherein the user input nulls effects of one or more lesions, wherein the user input triggers the update, by the system, based on the cardiac model and the update is configured to address crosstalk effects associated with remaining lesions;
  wherein nulling a lesion causes updating diameters at the positions along the length which are associated with the nulled lesion, and wherein the updated diameters cause the index drop associated with the nulled lesion to be reduced.

* * * * *